United States Patent
Maeda

(10) Patent No.: US 9,268,498 B2
(45) Date of Patent: Feb. 23, 2016

(54) STORAGE CONTROLLER, SYSTEM, AND METHOD TO CONTROL THE COPY AND RELEASE PROCESSES OF VIRTUAL VOLUMES

(71) Applicant: FUJITSU LIMITED, Kawasaki-shi, Kanagawa (JP)

(72) Inventor: Jun Maeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 114 days.

(21) Appl. No.: 14/301,387

(22) Filed: Jun. 11, 2014

(65) Prior Publication Data

US 2014/0380006 A1  Dec. 25, 2014

(30) Foreign Application Priority Data

Jun. 25, 2013  (JP) .................................. 2013-132592

(51) Int. Cl.
*G06F 3/06* (2006.01)
*G06F 12/02* (2006.01)

(52) U.S. Cl.
CPC .............. *G06F 3/065* (2013.01); *G06F 3/0604* (2013.01); *G06F 3/0608* (2013.01); *G06F 3/0647* (2013.01); *G06F 3/0665* (2013.01); *G06F 3/0683* (2013.01); *G06F 3/0689* (2013.01); *G06F 12/0223* (2013.01); *G06F 2003/0697* (2013.01)

(58) Field of Classification Search
CPC .... G06F 12/0223; G06F 3/0647; G06F 3/065
USPC ................................................ 711/161, 162
See application file for complete search history.

(56) References Cited

U.S. PATENT DOCUMENTS

| 2011/0202742 | A1* | 8/2011 | Shibayama et al. | .......... 711/165 |
| 2012/0096231 | A1  | 4/2012 | Morishita et al. | |
| 2012/0124287 | A1* | 5/2012 | Shibayama et al. | .......... 711/114 |

(Continued)

FOREIGN PATENT DOCUMENTS

| EP | 2254036 | 11/2010 |
| JP | 2010271808 | 12/2010 |
| JP | 201176572 | 4/2011 |

OTHER PUBLICATIONS

Extended European Search Report dated Nov. 17, 2014 for corresponding European Patent Application No. 14172325.4, 7 pages. ***
Please note EP2254036A2 cited herein, was previously cited in an IDS filed on Jun. 11, 2014.***.

*Primary Examiner* — Than Nguyen
(74) *Attorney, Agent, or Firm* — Fujitsu Patent Center

(57) ABSTRACT

A storage controller including a processor, wherein the processor: performs a copy process in which a destination virtual volume is created by copying a source virtual volume in accordance with a copy instruction, performs a release process in which allocation of a destination storage area to a corresponding area of the destination virtual volume that corresponds to an unallocated area to which a source storage area is not allocated, among areas of the source virtual volume at a time point when the copy instruction is received is released in the copy process, specifies a corresponding area that is an unallocated area including one or more update areas updated before the copy process and the release process after the copy instruction among one or more unallocated areas of the source virtual volume, and suppresses the release relating to the corresponding area that corresponds to the specified unallocated area.

19 Claims, 20 Drawing Sheets

(56) References Cited

U.S. PATENT DOCUMENTS

2013/0246724 A1* 9/2013 Furuya .......................... 711/162
2014/0052947 A1* 2/2014 Usui .............................. 711/162
2014/0115289 A1* 4/2014 Morishita et al. ............. 711/162

* cited by examiner

FIG. 8

ALLOCATION MANAGEMENT TABLE  ~14b

| LOGICAL VOLUME | LOGICAL ADDRESS (KByte) | ALLOCATION STATE |
|---|---|---|
| 0x000A | 0x00000 | 0 |
| 0x000A | 0x07D00 | 1 |
| 0x000A | 0x0FA00 | 0 |
| 0x000A | 0x17700 | 1 |
| 0x000A | 0x1F400 | 0 |
| 0x000A | 0x27100 | .. |
| .. | .. | 0 |
| 0x000B | 0x00000 | .. |
| .. | .. | |

ALLOCATION OF PHYSICAL AREA
ACCORDING TO WRITE INSTRUCTION

RELEASE OF PHYSICAL AREA
ACCORDING TO RELEASE INSTRUCTION

STORAGE CONTROLLER, SYSTEM, AND METHOD TO CONTROL THE COPY AND RELEASE PROCESSES OF VIRTUAL VOLUMES

CROSS-REFERENCE TO RELATED APPLICATION

This application is based upon and claims the benefit of priority of the prior Japanese Patent Application No. 2013-132592, filed on Jun. 25, 2013, the entire contents of which are incorporated herein by reference.

FIELD

The present invention relates to a storage controller, a storage system, and a computer-readable recording medium having stored therein a control program.

BACKGROUND

In a storage product such as a disk array system or a storage system such as a computer, in order to back up data stored in a storage device (a storage or a memory device), various techniques are used. For example, an "advanced copy function" is known in which a storage controller such as a controller module (hereinafter, referred to as a CM) performs backup of data stored in a storage using firmware of the storage controller without using resources of a host apparatus (high-level apparatus).

Data backup techniques supported in the advanced copy function include a one point copy (OPC) function and a quick OPC (hereinafter, referred to as QOPC) function.

FIGS. 18 and 19 respectively illustrate the appearances of copy processes according to the OPC and the QOPC.

According to the OPC, a storage controller generates a snapshot of the data of a backup target at a copy start time point. As illustrated in FIG. 18, when an OPC start instruction (copy instruction) is received, the storage controller generates a snapshot of the copy source volume and issues a logical copy completion response to the host apparatus, thereby showing that the copy has been completed to the host apparatus. Then, the storage controller actually copies (physical copy) all the data of the copy source volume at a time point when the instruction is received on the background, thereby generating a copy destination volume.

In the OPC, in a case where there is an update instruction for an area of the copy source volume for which the background copy has not been completed, the storage controller performs the process of copying the data of the area to the copy destination volume before the update. In addition, in a case where there is a reference/update instruction for an area of the copy destination volume for which the background copy has not been completed, the storage controller performs a copy process of the area before the reference/update.

According to the OPC, the storage controller can generate a snapshot of a certain time point at high speed. Accordingly, after a response to the OPC start instruction is received, the host apparatus can perform reference/update of both the copy source volume and the copy destination volume.

In addition, as an extension function of such an OPC, there is the QOPC that realizes a differential copy.

As illustrated in FIG. 19, according to the QOPC, similar to the OPC, a copy destination volume of a copy source volume at a certain time point is generated. In addition, in the QOPC, different from the OPC, after a background copy is started, an update place at which data has been updated is stored. Therefore, in the QOPC, the storage controller can perform generation of a copy destination volume of the second time and after that, in other words, restarting by only making a copy on the background.

In addition, in the storage system, as a technique for efficiently using the resources available inside the storage device, there are cases where a storage virtualization function such as thin provisioning for decreasing the physical capacity of the storage by virtualization of resources of the storage is used.

FIGS. 20A and 20B are diagrams that illustrate an example of the storage virtualization function. FIG. 20A is a diagram that illustrates an example of a storage allocating process, and FIG. 20B is a diagram that illustrates an example of a storage releasing process.

Hereinafter, the storage virtualization function will be described to be the thin provisioning, and a logical volume (virtual volume) in the thin provisioning will be referred to as a thin provisioning volume (TPV).

In the thin provisioning, when a logical volume is to be generated, the storage controller allows the host apparatus to recognize a virtual volume (TPV) without mapping with a physical disk arranged inside a storage pool. Then, when a request for a data writing process (write input output (I/O)) for writing data into the TPV or the like is issued from the host apparatus, the storage controller, as illustrated in FIG. 20A, allocates actual storage resources (physical capacity) from the storage pool to the TPV as is requested.

As illustrated in FIG. 20B, when there is the issuance of an UNMAP command or a physical area release instruction such as a format instruction of a volume from a host apparatus, the storage controller can release the allocation of the physical resources of an area that is in the unused state after the allocation of the physical resources.

Meanwhile, when data backup is operated using a storage virtualization function such as the TPV for a copy source and a copy destination, there may be an area of the copy source to which physical resources are not allocated. In such a case, in order to maintain the consistency of the copy source and the copy destination, there are cases where an area of the copy source to which physical resources are not allocated is regarded as an area in which "0" data is written, and the process of copying "0" data to a physical area of the copy destination.

However, such a process of copying "0" data is for making a backup of actually meaningless data. In other words, in the storage system, a data copy process that is originally unnecessary is performed, and there is a possibility that the process of copying data (data of an area of the copy source to which physical resources are allocated) desired to be backed up may be delayed. In addition, by copying "0" data of the area of the copy source to which physical resources are not allocated, a TPV of the copy destination is in a state in which physical resources are allocated thereto, whereby the physical resources are unnecessarily used.

In order to resolve such inconvenience, technologies are known in which, for example, when a virtual volume of the thin provisioning is copied, in a case where a storage area is not allocated to a copy source area, a storage area of a copy destination area corresponding thereto is released (for example, see Japanese Laid-open patent publication No. 2011-76572 and Japanese Laid-open patent publication No. 2010-271808).

As described above, according to the technologies for releasing a storage area of a copy destination that corresponds to a copy source area to which a storage area is not allocated, the delay of the copy process can be suppressed, and the amount of used physical resources can be reduced.

However, according to such technologies, there are cases where an inconvenience occurs such as the occurrence of the release of a TPV of a copy destination even when data is written into the TPV to which physical resources are allocated.

This is not limited to the OPC and the QOPC but is similarly applied to various backup techniques capable of updating data of the copy destination for making a backup of a virtual volume to which a physical area is variably allocated in accordance with the volume use status.

SUMMARY

According to an aspect of the embodiments, a storage controller includes a processor, wherein the processor: performs a copy process in which a copy destination virtual volume is created by copying a virtual volume to which a storage area of a storage device is variably allocated in accordance with a volume use status in accordance with a copy instruction; performs a release process in which allocation of a copy destination storage area to a corresponding area of the copy destination virtual volume that corresponds to an unallocated area to which a copy source storage area is not allocated, among areas of a copy source virtual volume at a time point when the copy instruction is received is released, in the copy process; manages information that represents one or more update areas of the copy destination virtual volume updated before the copy process and the release process are performed and after the copy instruction; specifies an unallocated area for which a corresponding area includes the one or more update areas among one or more unallocated areas of the copy source virtual volume; and suppresses the release of the allocation of the copy destination storage area to the corresponding area corresponding to the specified unallocated area in the release process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram that illustrates an example of an allocation management table held by the holding unit illustrated in FIG. 6;

FIG. 20A is a diagram that illustrates an example of an allocation process of a storage, and FIG. 20B is a diagram that illustrates an example of a release process of the storage.

DESCRIPTION OF EMBODIMENTS

Hereinafter, embodiments will be described with reference to the drawings.

[1] Embodiment

[1-1] Storage System

Figure 1:
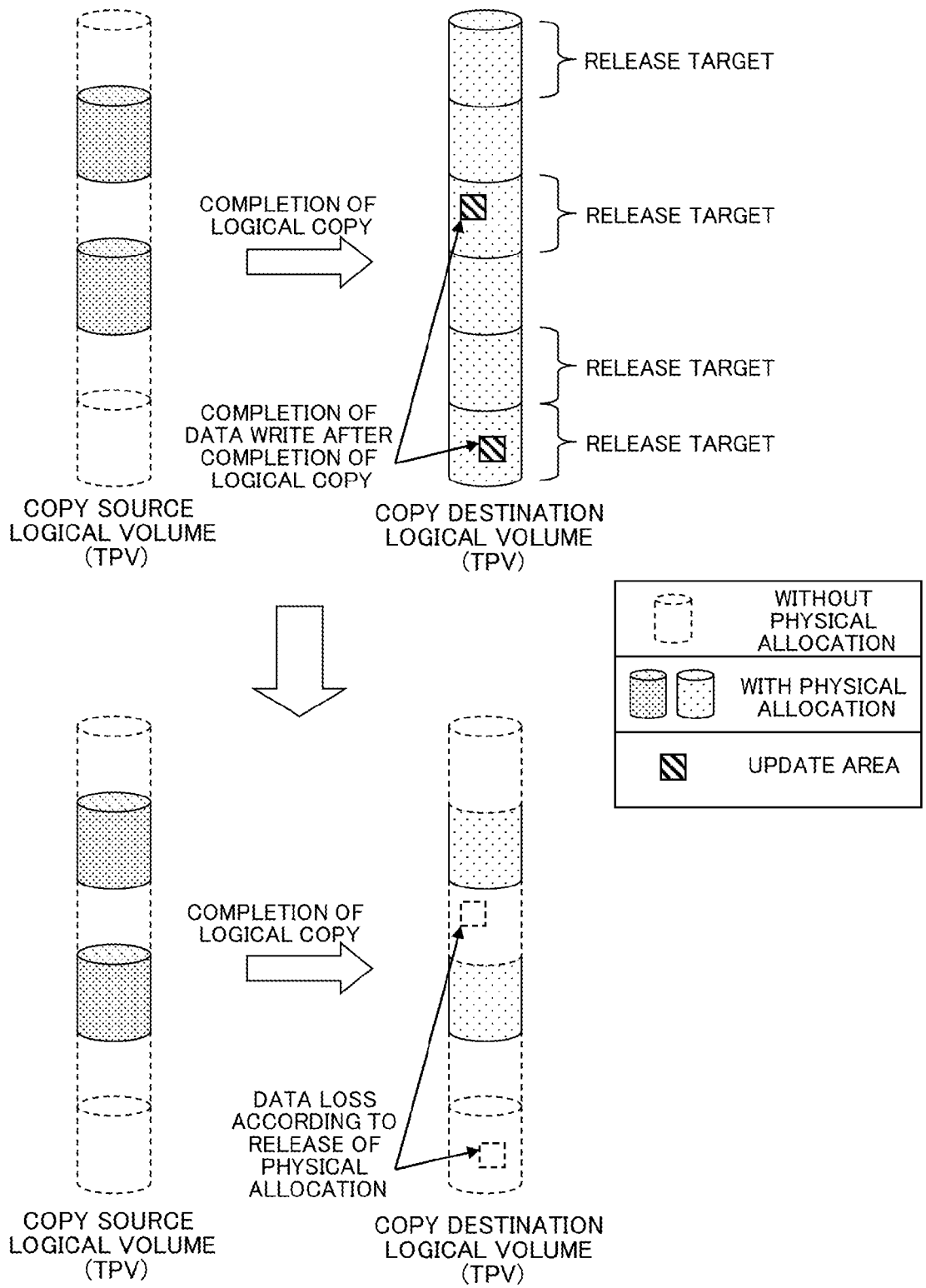
FIG. 1 is a diagram that illustrates a case where there is an update of a logical volume of a copy destination after completion of a logical copy.
Figure 2:
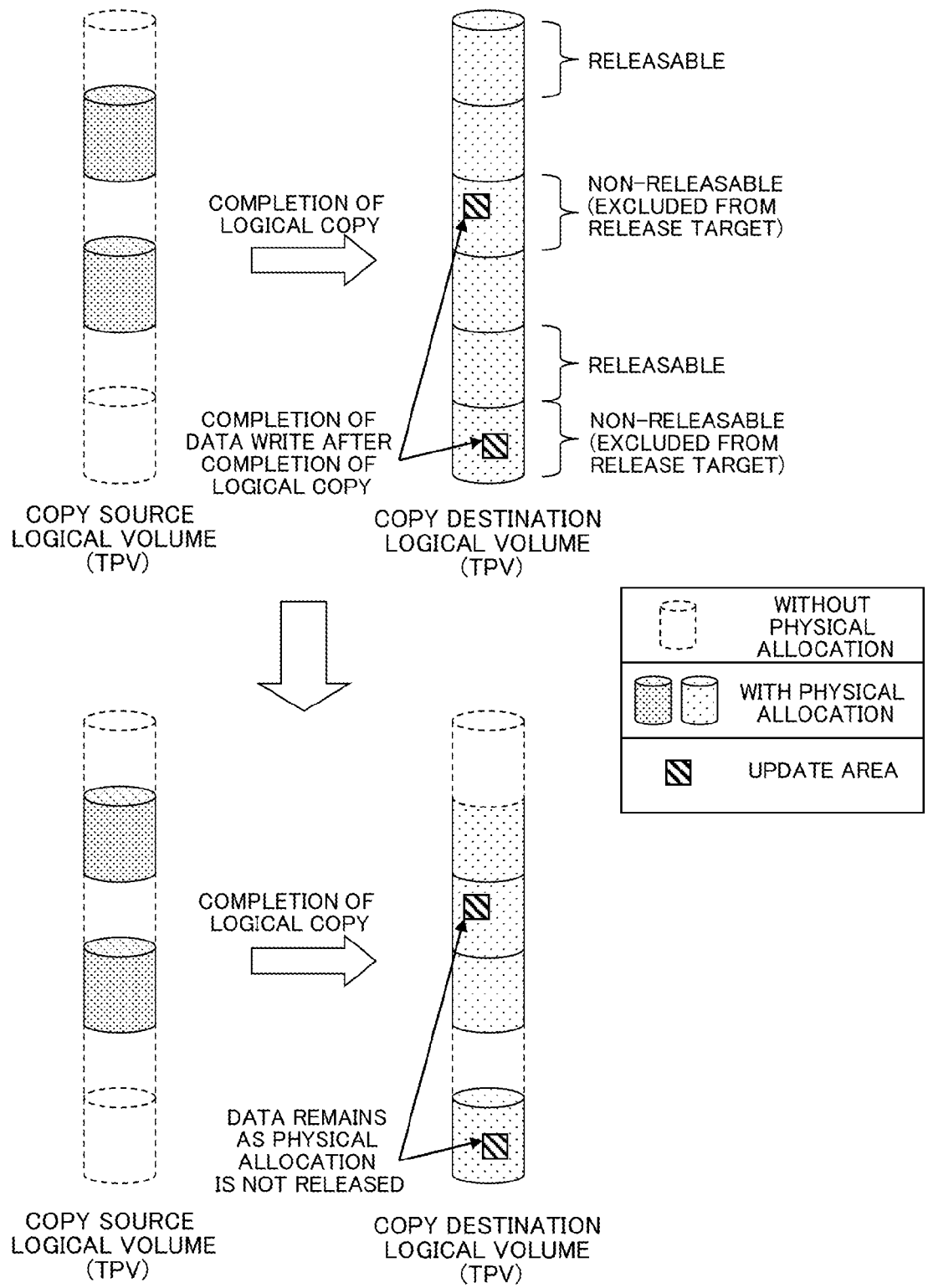
FIG. 2 is a diagram that illustrates a case where there is an update of a logical volume of a copy destination after the completion of a logical copy in a storage system according to an embodiment.

FIG. 1 is a diagram that illustrates a case where there is an update of a logical volume of a copy destination after completion of a logical copy, and FIG. 2 is a diagram that illustrates a case where there is an update of a logical volume of a copy destination after the completion of a logical copy in a storage system according to an embodiment. In FIGS. 1 and 2, an area (chunk) denoted by broken lines represents physically unallocated area, an area (chunk) denoted by solid lines represents a physically allocated area, and an area (block) denoted by diagonal lines represents an update area in which update data is written.

In one point copy (OPC) or quick OPC (QOPC) using a storage virtualization function such as a thin provisioning volume (TPV), right after starting to make a backup, a storage controller notifies a host apparatus of completion of logical copy so as to allow the copy process to be seen as being completed and then performs a copy (physical copy) process on the background. When being notified of the completion of the logical copy, the host apparatus regards the OPC/QOPC as being completed and can freely access (refer to or update) the TPV of a backup destination.

For example, in a case where a physically-unallocated area is present in a copy source of an OPC/QOPC session, there are cases where the host apparatus issues an update instruction for an area of a copy destination that corresponds to a physically-unallocated are of a copy source right after an OPC/QOPC start instruction (copy instruction). In such a case, the storage controller receives the update instruction, performs physical allocation of the corresponding area of the copy destination, and then, updates the area. Alternatively, in a case where physical allocation has been already performed, an operation of updating the area of the copy destination is performed (see "COPY DESTINATION LOGICAL VOLUME" represented on the upper side in FIG. 1).

On the other hand, as described above, a technology is known in which the storage area of a corresponding copy destination area is released in a case where a storage area is not allocated to a copy source area in the copy process. A case will be considered in which this technology is used in the OPC/QOPC.

From the viewpoint of the sequence (consistency) of the issuance of a TPV copy instruction and an update instruction for a copy destination TPV, it is preferable that, after the physically allocated area of the copy destination TPV is released in accordance with the copy instruction, the area be physically allocated in accordance with the update instruction, and update data is written.

However, actually, there are cases where physical copy accompanied with an OPC/QOPC start instruction made by a storage controller is delayed from the completion of logical copy, for example, to be performed after update data relating to an update instruction is written. In such cases, the update date relating to the update instruction issued after the completion of the logical copy may be lost in accordance with the release of the physical allocation of a copy destination relating to the physical copy (see "COPY DESTINATION LOGICAL VOLUME" represented on the lower side in FIG. 1).

In this way, in a storage controller, an inconvenience may occurs due to the breakdown of consistency (consistency of data) of the execution sequence of a TPV copy process according to the OPC/QOPC or the like and an update process for a copy destination TPV after an instruction for the copy process.

Thus, a storage system (storage controller) according to an embodiment solves the above-described inconvenience by performing the following process of (i) to (iii).

(i) One or more update areas of a copy destination TPV (copy destination virtual volume) updated before physical copy (a copy process and a release process) is performed and after completion of logical copy (after a copy instruction) are managed.

(ii) From among unallocated areas of a copy source TPV (copy source virtual volume), an unallocated area for which a corresponding area of the corresponding copy destination TPV includes one or more update areas is specified.

(iii) In the release process performed in the physical copy, the release of the allocation of a copy destination storage area to an update area corresponding to the specified unallocated area is suppressed.

According to the process of (i) to (iii) described above, as illustrated in "COPY DESTINATION LOGICAL VOLUME" represented on the upper side in FIG. 2, corresponding areas (chunk) including update areas that correspond to unallocated areas (chunk) of the copy source TPV (copy source virtual volume) are excluded from release targets of the release process performed in the physical copy.

Therefore, in the storage system (storage controller) according to the embodiment, as illustrated in "COPY DESTINATION LOGICAL VOLUME" represented on the lower side in FIG. 2, even after the physical copy is completed, the physical allocation to areas including update areas of the copy destination TPV is not released, and the update data can be maintained.

In this way, the consistency (consistency of data) of the execution sequence of the copy process of the TPV according to the OPC/QOPC or the like and the update process for the copy destination TPV after the instruction of the copy process can be maintained, whereby the above-described inconvenience can be solved.

Hereinafter, the storage system (storage controller) according to the embodiment will be described in detail.

[1-2] Example of Configuration of Storage System

Figure 3:
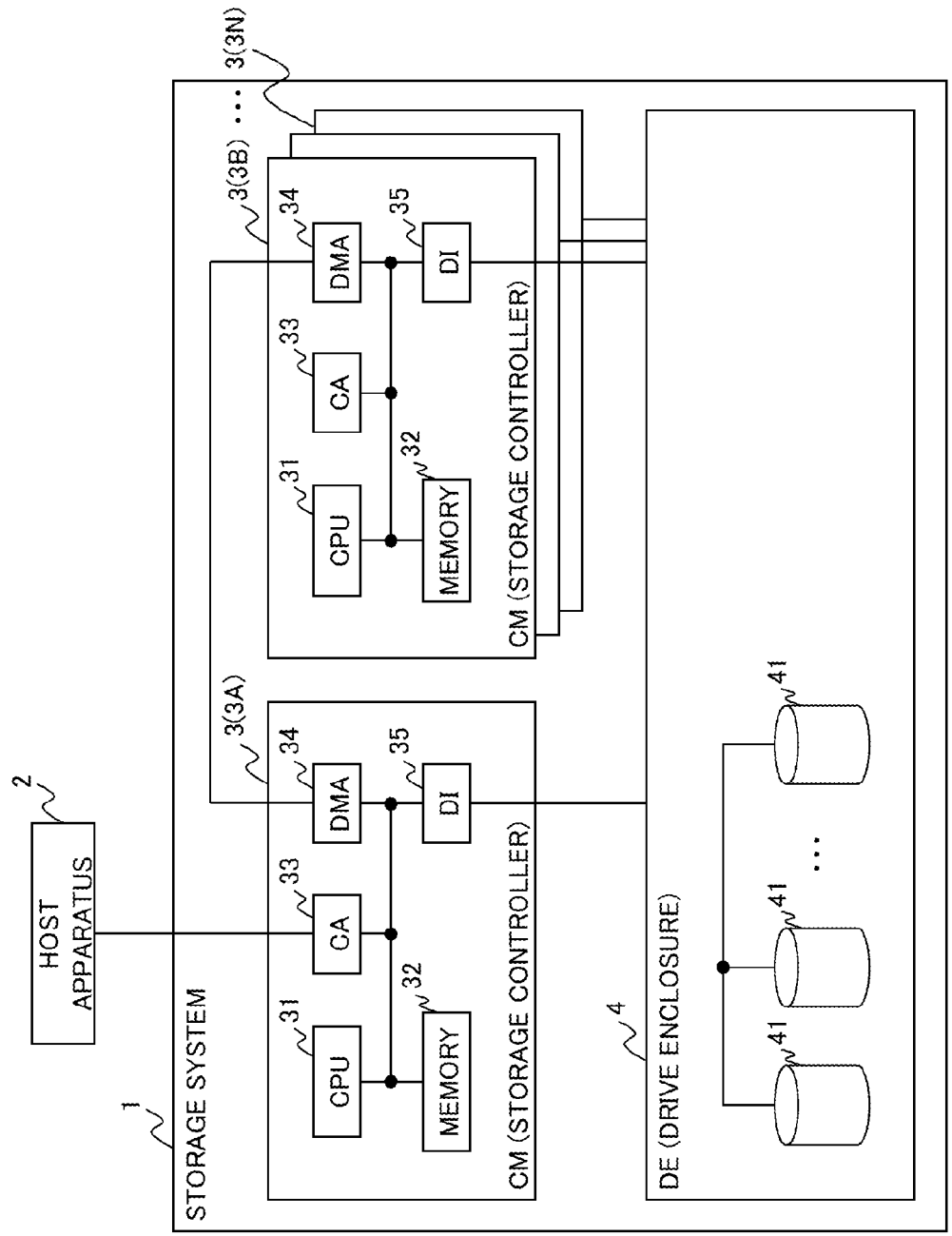
FIG. 3 is a diagram that illustrates an example of the configuration of a storage system as an example of an embodiment.
Figure 4:
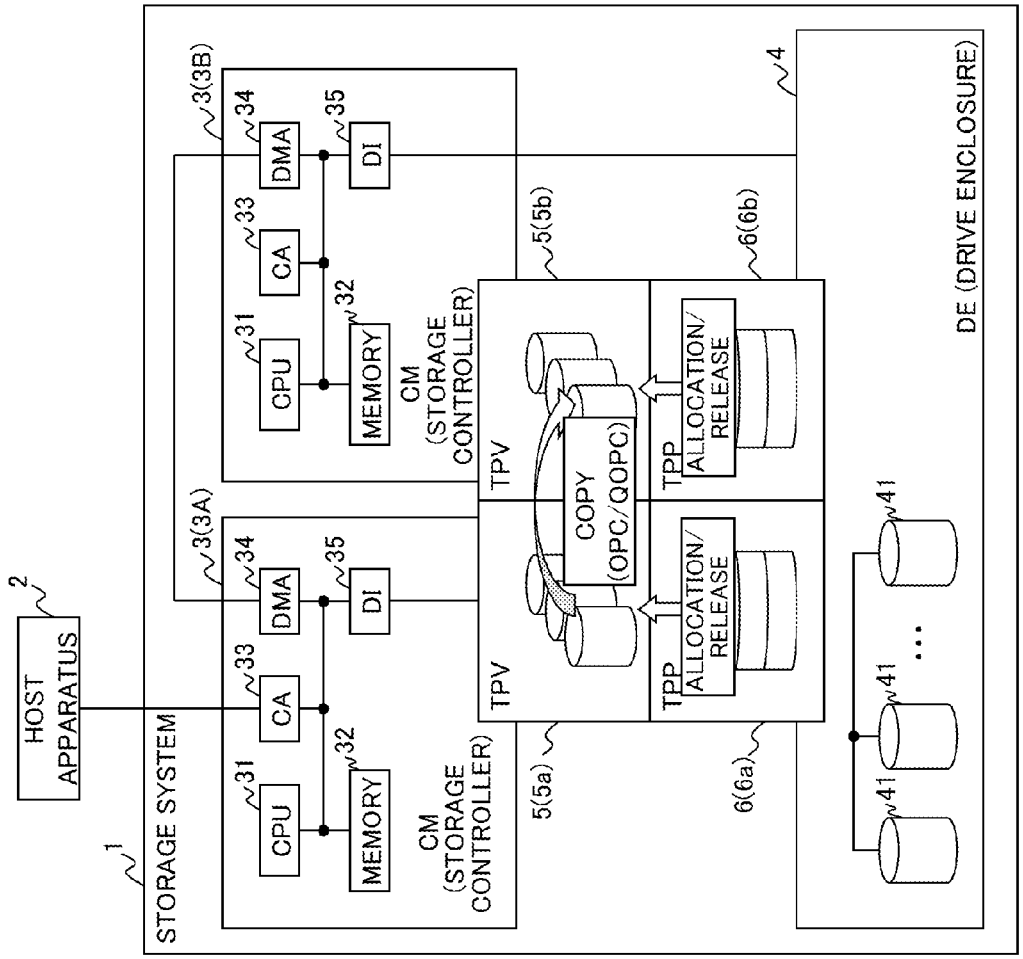
FIG. 4 is a diagram that illustrates an example of a backup mode according to the storage system illustrated in FIG. 3.

FIG. 3 is a diagram that illustrates an example of the configuration of the storage system 1 as an example of the embodiment, and FIG. 4 is a diagram that illustrates an example of a backup mode according to the storage system 1 illustrated in FIG. 3.

As illustrated in FIG. 3, the storage system 1 is connected to a host apparatus 2, receives various requests from the host apparatus 2, and performs various processes according to the requests.

The host apparatus 2 is a host computer (high-level apparatus), and, examples of the host apparatus 2 include various information processing apparatuses such as a personal computer (PC), a server, and a mainframe. The host apparatus 2 is connected to the storage system 1 and, for example, issues various access instructions for TPVs 5a and 5b to be described later. In addition, the host apparatus 2 issues an OPC/QOPC start instruction (copy instruction), an update instruction for a copy destination TPV 5b, and the like to be described later.

The storage system 1 includes a plurality of controller modules (CM) 3A to 3N and a disk enclosure (hereinafter, referred to as a DE) 4. Hereinafter, in a case where the CMs 3A to 3N do not need to be discriminated from one another, the controller modules will be simply referred to as CMs 3. In addition, for the simplification of description, as illustrated in FIG. 4, the storage system 1 will be described as being equipped with two CMs 3 including CMs 3A and 3B.

The DE 4 stores a plurality of drives 41 that are physical volumes. The drive (storage device) 41 is any one of various devices including a magnetic disk such as a hard disk drive (HDD) or a semiconductor drive device such as a solid state drive (SSD) and is hardware storing various kinds of data, programs, and the like.

The CM (storage controller) 3 is connected to the host apparatus 2, the DE 4, and the other CM 3 and is a computer (information processing apparatus) that performs resource management in the storage system 1. In addition, the CM 3 performs various processes (a data writing process, a data updating process, a data reading process, a data copying process, and the like) for the DE 4 in accordance with requests from the host apparatus 2 and the other CM 3.

Here, the CM 3 according to this embodiment has a storage virtualization function such as thin provisioning and reduces the cost of the facility by reducing the physical capacity of the storage in the DE 4.

For example, as illustrated in FIG. 4, the CM 3 manages TPVs 5a and 5b that are logical volumes recognizable from the host apparatus 2 and thin provisioning pools (TPPs) 6a and 6b. Hereinafter, in a case where the TPVs 5a and 5b and the TPPs 6a and 6b do not need to be discriminated from each other, they will be simply referred to as the TPV 5 and the TPP 6.

The TPV 5 is at least one virtual volume to which a storage area of the drive 41 is variably allocated in accordance with the volume use status and is managed by the storage virtualization function included in the storage system 1 (CM 3). The host apparatus 2 recognizes the TPV 5 as at least one logical volume and makes requests for various processes for a storage area (logical data area) specified by the logical address of the TPV 5 for the storage system 1.

The TPP 6 is a storage that is formed by at least one drive 41 and is a virtual storage pool of physical resources (storage areas) allocated to the TPV 5.

For example, each CM 3 can individually manage the TPV 5 and the TPP 6. For example, as illustrated in FIG. 4, it may be configured such that a CM 3A manages the TPV 5a and the TPP 6a, and a CM 3B manages the TPV 5b and the TPP 6b. Here, the TPPs 6a and 6b may use resources of mutually-different drives 41 or may use resources of some or all the drives 41 to be common.

In addition, the CM 3 has an advanced copy function such as the OPC or the QOPC and performs backup (copy) of data stored in the TPV 5 using the firmware of the CM 3 without using the resources of the host apparatus 2.

Hereinafter, the storage system 1 (CM 3A), as illustrated in FIG. 4, will be described to use the TPV 5a managed by the CM 3A as a copy source virtual volume and use the TPV 5b managed by the CM 3B as a copy destination virtual volume and generate (create or update) the TPV 5b by copying the TPV 5a.

In the example illustrated in FIG. 4, while it is represented that each one of the TPVs 5a and 5b is formed by three logical volumes, the TPV 5a as a copy source may be configured as at least one logical volume. In addition, the TPV 5b as a copy destination may be omitted before the copy process.

[1-3] Configuration of Hardware

Figure 5:
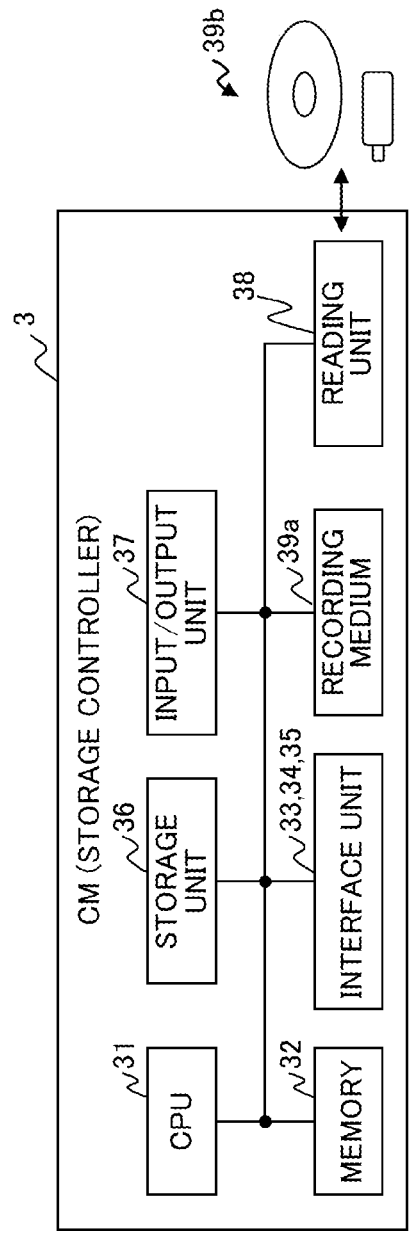
FIG. 5 is a diagram that illustrates an example of the hardware configuration of a controller module illustrated in FIG. 3.

Next, the hardware configuration of the storage system 1 will be described with reference to FIGS. 3 and 5. FIG. 5 is a diagram that illustrates an example of the hardware configuration of the CM 3 illustrated in FIG. 3.

The CM 3, as illustrated in FIGS. 3 and 5, is equipped with a central processing unit (CPU) 31, a memory 32, a channel adapter (CA) 33, a direct memory access (DMA) port 34, and a disk interface (DI) 35. In addition, as illustrated in FIG. 5, the CM 3 may be further equipped with a storage unit 36, an input/output unit 37, a reading unit 38, and a recording medium 39a.

The CPU 31 is an arithmetic processing unit (processor) that is connected to blocks 31 to 39a disposed inside the CM 3 and performs various control processes and arithmetic operations. The CPU 31 realizes various functions of the CM 3 by executing programs (firmware) stored in the memory 32, the storage unit 36, the recording medium 39a, the DE 4, a read only memory (ROM) not illustrated in the figure, and the like. Here, the processor is not limited to the CPU 31 but, an electronic circuit such as a micro processing unit (MPU) may be used as the processor.

The memory 32 is a storage device such as cache memory that stores various kinds of data and programs. When a program is to be executed, the CPU 31 stores and expands data or a program in the memory 32. For example, the memory 32 temporarily stores a program used by the CPU 31 for serving as a storage controller, data to be written into the DE 4 from the host apparatus 2, data read from the DE 4 to the host apparatus 2 or the other CM 3, and the like. As the memory 32, for example, there is a volatile memory such as a random access memory (RAM).

The CA 33 is an adapter that is connected to the host apparatus 2 and controls interface with the host apparatus 2 and performs data communication with the host apparatus 2. The DMA port 34 is a port that is connected to the DMA port 34 disposed inside the other CM 3 and controls interface with the other CM 3 and performs data communication with the other CM 3, for example, through the memory 32. The DI 35 controls interface with the DE 4 housed in the storage system 1 and performs data communication with the DE 4. In the example illustrated in FIG. 5, the CA 33, the DMA port 34, and the DI 35 are collectively represented as an interface unit.

The storage unit 36 is hardware that stores various kinds of data and programs, and the like. As examples of the storage unit 36, there are various devices including a magnetic disk device such as an HDD, a semiconductor drive device such as an SSD, and a non-volatile memory such as a flash memory.

The input/output unit 37 includes at least one of an input device such as a mouse or a keyboard and an output device such as a display or a printer. The input/output unit 37 receives an operation instruction according to an operation of a supervisor or the like of the storage system 1 through the input device and displays (outputs) a processing result acquired by the storage system 1, an alert, or the like to the output device.

The recording medium 39a is a storage device such as a flash memory or a ROM and records various kinds of data and programs. The reading unit 38 is a device that reads out data or a program recorded in a computer-readable recording medium 39b such as an optical disc or a universal serial bus (USB) memory.

In at least one of the recording media 39a and 39b, a control program realizing the function of the storage system 1 (CM 3) according to this embodiment may be stored. For example, the CPU 31 expands the control program input from the recording medium 39a or input from the recording medium 39b through the reading unit 38 in a memory device such as the memory 32 and executes the control program. In this way, the computer as the CM 3 realizes the function of the storage controller according to this embodiment by using the CPU 31.

The above-described blocks 31 to 39a and the DMA ports 34 of a plurality of the CMs 3 are connected through a bus so as to be communicable with one another.

In addition, the host apparatus 2 and the CA 33 and the DI 35 and the DE 4 are respectively connected so as to be communicable with each other through a LAN, an InfiniBand (registered trademark), a Fibre Channel, or the like.

Here, the above-described hardware configuration of the storage system 1 is merely an example. Accordingly, an increase/decrease in the hardware, division thereof, integration employing an arbitrary combination, or the like within the individual storage system 1 or the CM 3 may be appropriately performed.

In addition, the hardware of the CM 3 may be commonly used as a whole of the plurality of CMs 3.

[1-4] Configuration of CM

Figure 6:
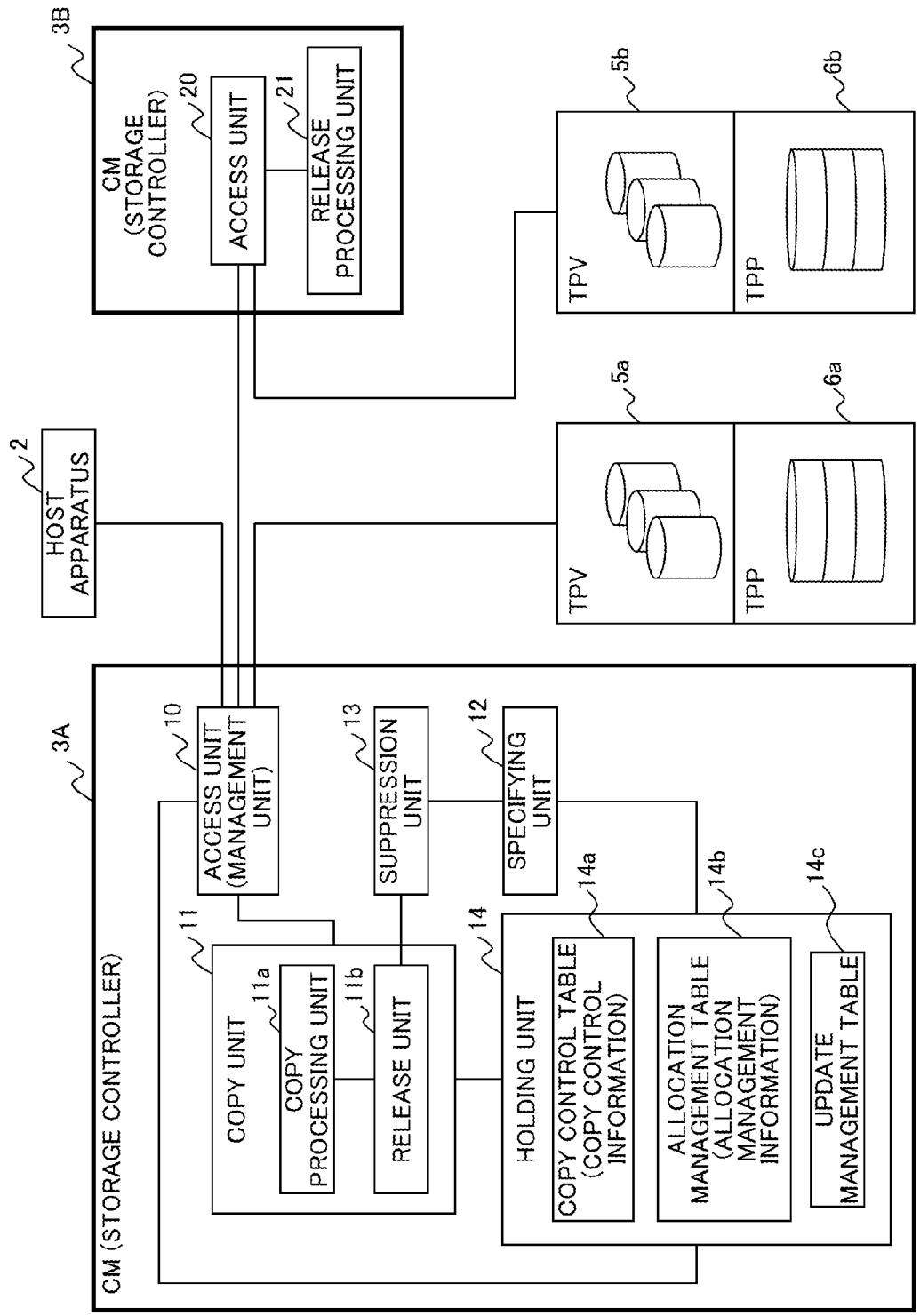
FIG. 6 is a diagram that illustrates an example of the functional configuration of the controller module illustrated in FIG. 3.

Next, the functional configuration of the storage system 1 (CM 3) illustrated in FIG. 3 will be described with reference to FIG. 6. FIG. 6 is a diagram that illustrates an example of the functional configuration of the CM 3 illustrated in FIG. 3.

Hereinafter, functions of the CM 3 relating to a copy process according to the OPC/QOPC or the like and a release process of the allocation of the TPP 6 to the TPV 5 accompanied with the copy process will be focused in description.

As illustrated in FIG. 6, the CM 3 includes a configuration illustrated in the CM 3A as the function of the CM 3 as a copy source and includes a configuration illustrated in the CM 3B as the function of the CM 3 as a copy destination.

[1-4-1] Configuration of Copy Source CM

First, the configuration of the copy source CM 3A will be described. The CM 3A is equipped with an access unit 10, a copy unit 11, a specifying unit 12, a suppression unit 13, and a holding unit 14.

The holding unit 14 holds a copy control table 14*a*, an allocation management table 14*b*, and an update management table 14*c*. The holding unit 14 is realized by the memory 32 or the storage unit 36 illustrated in FIG. 5, or the like.

The access unit (management unit) 10 receives an instruction from the host apparatus 2 through the CA 33 and transmits a response to the host apparatus 2. In addition, the access unit 10 transmits an instruction to the CM 3B through the DMA port 34 and receives a response from the CM 3B. Furthermore, the access unit 10 performs read/write data from/into the TPV 5*a* (TPP 6*a*) through the DI 35 and the like.

The CMs 3A and 3B can synchronize information through the DMA port 34 through the access unit 10 and an access unit 20 of the CM 3B. For example, the access unit 10 can share information of the tables 14*a* to 14*c*, information (the content of an instruction, an access range, update data, and the like) relating to various instructions such as a copy instruction or an update instruction from the host apparatus 2, information relating to the TPV 5, and the like with the access unit 20. For example, the access unit 10 can also receive an instruction from the host apparatus 2 to the CM 3B and transmit the instruction to the CM 3B through the DMA port 34.

In addition, the access unit 10 performs the process of the allocation of the physical area of the TPP 6*a* to the TPV 5*a*, the release thereof, and the like in accordance with a write instruction, a physical area release instruction, and the like from the host apparatus 2 by using the storage virtualization function.

Furthermore, the access unit 10 manages (refers and updates) information held by the holding unit 14 in accordance with an instruction or a response from the host apparatus 2 or the CM 3B.

Figure 7:
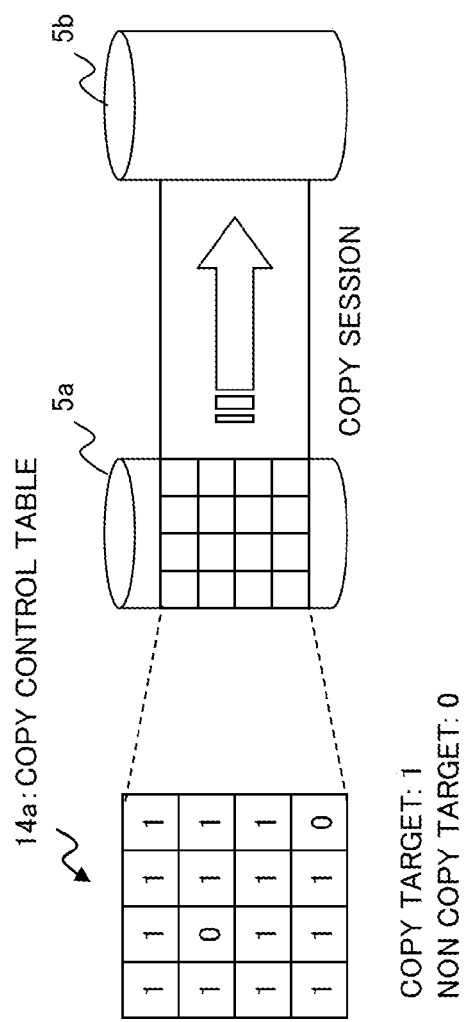
FIG. 7 is a diagram that illustrates an example of a copy control table held by a holding unit illustrated in FIG. 6.
Figure 9:
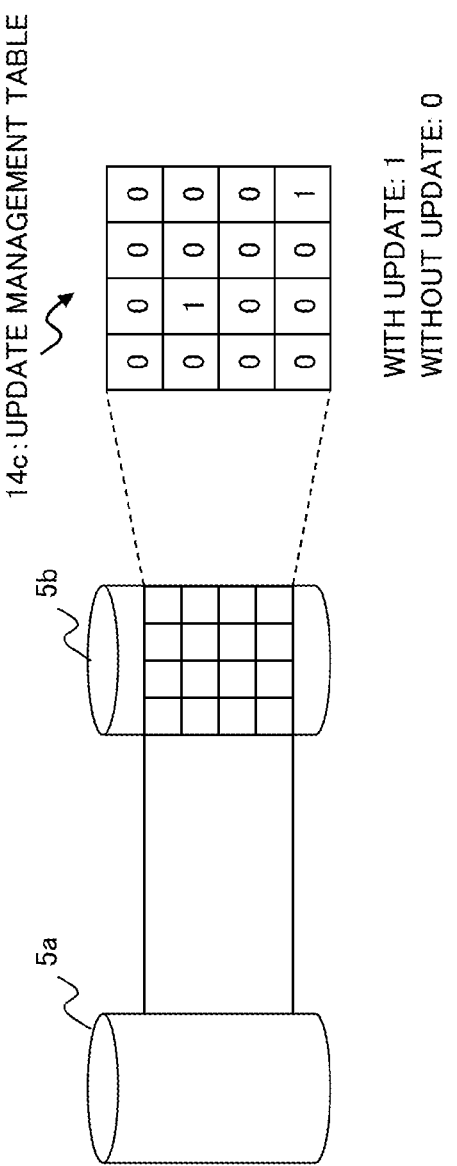
FIG. 9 is a diagram that illustrates an example of an update management table held by the holding unit illustrated in FIG. 6.

FIGS. 7 to 9 are diagrams that illustrate examples of the copy control table 14*a*, the allocation management table 14*b*, and the update management table 14*c* held by the CM 3 (holding unit 14) illustrated in FIG. 6.

The copy control table (copy control information) 14*a*, as illustrated in FIG. 7, is information that illustrates a target area of a copy process in the copy source TPV 5*a*. In the copy control table 14*a*, copy is performed or not is set for each area of a minimum unit (a block, a first size) in which the TPV 5*a* can be updated. For example, in the copy control table 14*a*, "1" representing a copy target or "0" representing a non-copy target is set in a bitmap form for each block (for example, 8 Kbytes).

When a start instruction (copy instruction) of the OPC or the QOPC is received from the host apparatus 2, the access unit 10 sets "1" to the block (target block) of a copy target of the copy control table 14*a* relating to the TPV 5*a* designated by the copy instruction so as to be updated. For example, in a case where the copy instruction is a start instruction of the OPC or a first start instruction of the QOPC, the target blocks are all the blocks of the TPV 5*a* designated by the start instruction. On the other hand, in a case where the copy instruction is a restart instruction of the QOPC, the setting of "1" to the target block is not performed.

In addition, when the copy process or the release process is performed by the copy unit 11 in accordance with the start instruction of the OPC/QOPC, the access unit 10 sets "0" to the target block for which the copy process or the release process has been performed in the copy control table 14*a* so as to be updated (reset). Furthermore, when there is an update instruction for the TPV 5*a* or the TPV 5*b* for which the copy process (the physical copy on the background) is incomplete, the CM 3A (copy unit 11) performs a copy process of an area relating to an update process before the update process. In such a case, the access unit 10 sets "0" to the target block of the copy control table 14*a* so as to be updated (reset) every time when the copy process is performed.

In addition, when an update instruction for the copy source TPV 5*a* is received from the host apparatus 2 after the completion of the copy process or the release process (physical copy) relating to the start instruction (the first start instruction or the restart instruction) of the QOPC, the access unit 10 updates the copy control table 14*a* as the function of the QOPC. In other words, the access unit 10 sets "1" to the target block of the copy control table 14*a* relating to the access area designated by the update instruction so as to be updated. The block to which "1" is set in the copy control table 14*a* is a block of the copy target of the copy process relating to the next restart instruction (restart instruction) of the QOPC.

The allocation management table (allocation management information) 14*b*, as illustrated in FIG. 8, is information that represents a status representing whether or not the storage area of the TPP 6*a* is allocated to the TPV 5*a* for each area of the allocation minimum unit (chunk, the second size, for example, 32 Mbytes). Here, the chunk size is larger than the block size and, for example, is an integer-multiple of the block size.

The allocation management table 14*b* includes information (for example, a logical unit number (LUN)) specifying a logical volume (TPV 5*a*), a logical address, and an allocation state. Here, the LUN of the logical volume may be unique information that can be used for specifying a logical volume.

For example, the allocation management table 14*b* includes information in which a logical volume of "0x000A", a logical address of "0x00000" (Kbytes), and an allocation state of "0" are associated with one another.

The allocation state is information that represents whether or not the storage area of the TPP 6*a* is allocated to the area of the allocation minimum unit in the TPV 5*a* and, for example, "0" represents unallocated, and "1" represents allocated. For example, the allocation state of "0" corresponding to the logical volume of "0x000A" and the logical address of "0x00000", which are illustrated in FIG. 8, represents that physical allocation is not made to the area (chunk) of logical addresses "0x00000" to "0x07CFF". In addition, the allocation state of "1" corresponding to the logical volume of "0x000A" and the logical address of "0x07D00 represents that physical allocation is made to the area (chunk) of logical addresses "0x07D00" to "0x0F9FF".

In accordance with a write instruction for a physically unallocated area of the TPV 5*a* from the host apparatus 2, the access unit 10 makes a physical allocation to a chunk that is an access target and updates the allocation state of the chunk to "1" in the allocation management table 14*b*. In addition, in accordance with the physical area release instruction from the host apparatus 2, the access unit 10 releases the physical allocation of the chunk that is the instruction target and updates the allocation state of the chunk to "0" in the allocation management table 14*b*.

The update management table 14c is information used for managing an update area of the copy destination TPV 5b updated in accordance with the update instruction issued from the host apparatus 2. Here, the update area is one or more areas of the copy destination TPV 5b updated before the physical copy (the copy process and the release process) and after the completion of the logical copy (after the copy instruction).

As illustrated in FIG. 9, in the update management table 14c, presence/no-presence of an update is set for each minimum unit (a block, the first size), which can be updated, of the TPV 5b. For example, in the update management table 14c, "1" representing the presence of an update or "0" representing no-presence of an update is set in a bitmap form for each block (for example, 8 Kbytes).

When an update instruction for the TPV 5b of the CM 3B is received from the host apparatus 2, the access unit 10 transmits the instruction to the CM 3B. Then, the access unit 10 sets "1" to the access area (block) relating to the update instruction in the update management table 14c so as to be updated.

In addition, when the copy process or the release process of the TPV 5a is completed, the access unit 10 sets "0" to the block of the update management table 14c to which "1" is set so as to be updated (reset).

In the area of the TPV 5a corresponding to the area of the TPV 5b to which "1" is set in the update management table 14c, "0" is set in the copy control table 14a (see FIGS. 7 and 9). The reason for this is that, as described above, when there is an update instruction for an area of the TPV 5a or the TPV 5b for which the copy process is incomplete, the CM 3A (copy unit 11) performs a copy process of an area relating to an update process before the update process and sets "0" to the corresponding bit of the copy control table 14a.

In other words, the information of the update management table 14c is acquired from the information of the copy control table 14a. Accordingly, the holding unit 14 may omit to hold the update management table 14c.

The copy unit 11 performs advanced copy according to an instruction from the host apparatus 2 through the access unit 10. For example, the copy unit 11 is equipped with a copy processing unit 11a and a release unit 11b.

The copy processing unit 11a performs a copy process in which the TPV 5a is copied in accordance with a copy instruction received by the access unit 10, and the TPV 5b is generated (created or updated) under the management of the CM 3B. More specifically, when the copy instruction is received, the copy processing unit 11a generates a copy session for performing the copy process by generating a pair of the TPVs 5 of the copy source and the copy destination and generates a snapshot of the TPV 5a. Then, the copy processing unit 11a issues a response of the completion of the logical copy to the host apparatus 2 though the access unit 10.

Thereafter, the copy processing unit 11a actually copies (physical copy) data of the TPV 5a at a time point when the instruction is received on the background, thereby generating the TPV 5b. More specifically, when the TPV 5a is copied in the copy process (copy session), the copy processing unit 11a determines an area (block) to which "1" is set as the target area of the copy process by referring to the copy control table 14a. Then, the copy processing unit 11a transmits copy data of the determined target area to the CM 3B through the access unit 10 together with control information including a copy area (range) of the copy destination.

In addition, in a case where there is an update instruction such as a write instruction for an area of the TPV 5a for which a background copy is incomplete, the copy processing unit 11a performs a copy process of copying the copy data of a corresponding area into the TPV 5b before an update process performed by the access unit 10. Furthermore, in a case where there is a reference/update instruction for an area of the TPV 5b for which a background copy is incomplete, the copy processing unit 11a performs a copy process for a corresponding area before a reference/update process performed by the access unit 20 in cooperation with the access unit 20 of the CM 3B.

The release unit 11b searches for an unallocated area among the areas of the copy source TPV 5a at a time point when the copy instruction is received in the copy process performed by the copy processing unit 11a. Here, the unallocated area is an area (chunk) to which a copy source storage area of the TPP 6a is not allocated. More specifically, the release unit 11b searches for a chunk of the TPV 5a to which "0" is set by referring to the allocation management table 14b in the release process.

Then, the release unit 11b releases the allocation of the copy destination storage area to a corresponding area (release target area) of the copy destination TPV 5b that corresponds to an unallocated area detected by the search. More specifically, the release unit 11b instructs a release processing unit 21 of the CM 3B to release a corresponding area of the copy destination TPV 5b that corresponds to the unallocated area detected through the search.

In addition, the release unit 11b can issue a release instruction to the CM 3B by transmitting a release command through the DMA port 34. In this release command, information (for example, the LUN) specifying the TPV 5b (logical volume), a start logical address (for example, a logical block address (LBA)) of a corresponding area (range), and the release size are included. As the LUN of the TPV 5b, the release unit 11b can use the LUN of the copy destination acquired when a copy session relating to a copy instruction is generated by the copy processing unit 11a. In addition, the LBA of the TPV 5b and the size can be generated from the range of the copy session of the copy source by the release unit 11b.

Here, as described with reference to FIGS. 1 and 2, there are cases where an update area is included in the corresponding area (see "RELEASE TARGET" represented in FIG. 1). In such cases, when the physical allocation to a chunk including the update area is released, data of the update area disappears.

Thus, the release unit 11b notifies the specifying unit 12, which will be described later, of an unallocated area detected according to the search. The specifying unit 12 and the suppression unit 13 to be described later determine whether or not an update area is included in a corresponding area of the copy destination TPV 5b that corresponds to the notified unallocated area. In a case where it is determined that the update area is included in the corresponding area, the specifying unit 12 and the suppression unit 13 notify the release unit 11b that the unallocated area is an area that has been physically allocated.

In this way, the release unit 11b can release the allocation of the storage area of the copy destination TPP 6b to the corresponding area for unallocated areas except for the unallocated area notified as being physically allocated from the suppression unit 13 among unallocated areas.

It is preferable that the above-described process performed by the release unit 11b be performed before the copy process performed by the copy processing unit 11a. When the chunk of the TPV 5b is released by the release unit 11b, bits of a plurality of blocks corresponding to the released chunk in the copy control table 14a are set to "0" by the access unit 10. Accordingly, the area of the copy target for the copy processing unit 11a can be reduced, whereby the processing time taken for the copy process can be shortened. In addition, by performing the release process before the copy process, an unnecessary process is not performed in which, after unnecessary physical allocation (physical allocation according to "0" data), the allocation is released, whereby the resources can be efficiently used.

The specifying unit 12 refers to the update management table 14c of the holding unit 14 that is managed by the access unit 10 in the release process. Then, the specifying unit 12 specifies an unallocated area for which a corresponding area of the corresponding copy destination TPV 5b includes one or more update areas of the copy destination TPV 5b among one or more unallocated areas of the copy source TPV 5a.

Figure 10:
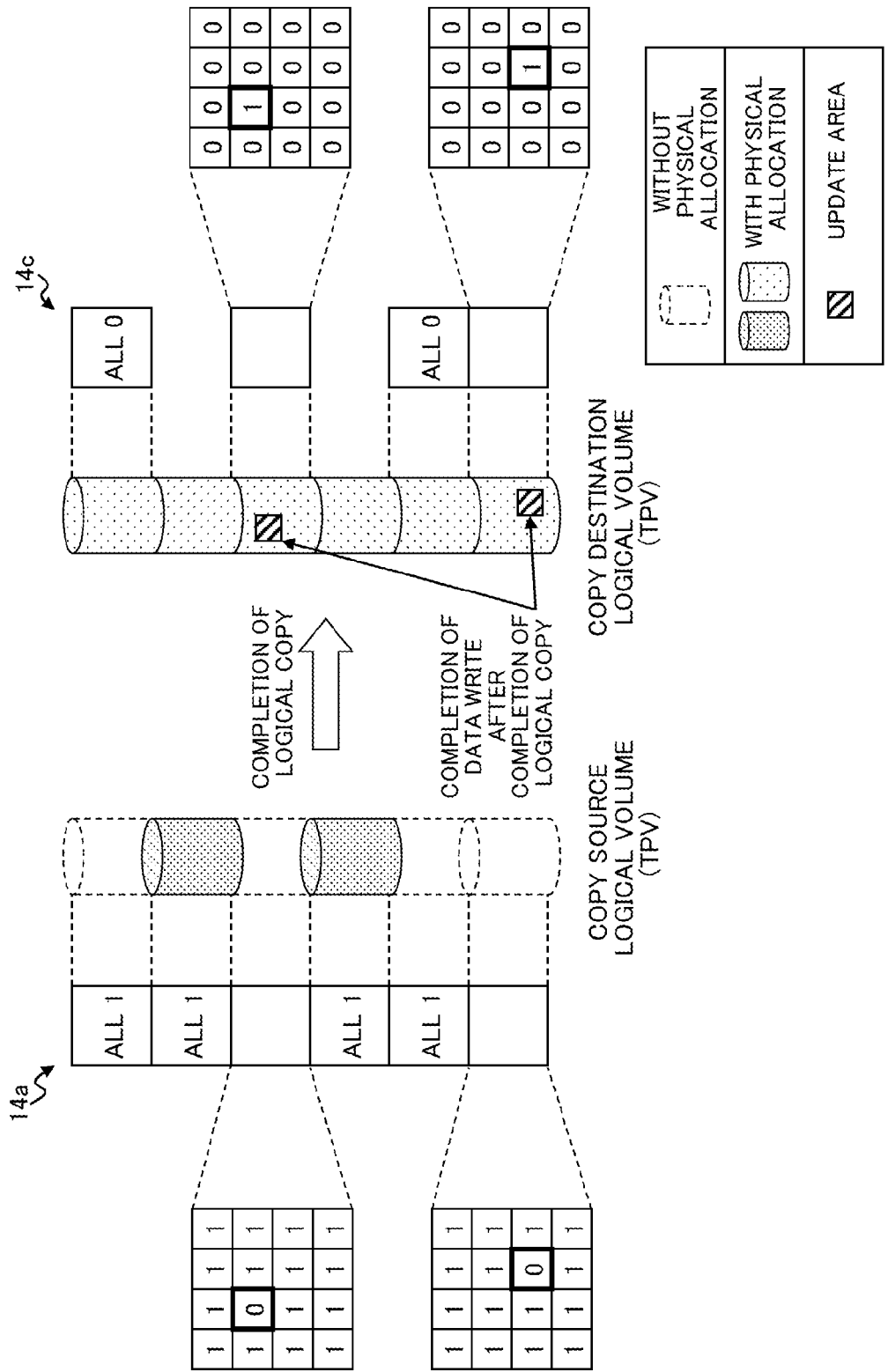
FIG. 10 is a diagram that illustrates the process of a specifying unit illustrated in FIG. 6.

FIG. 10 is a diagram that illustrates the process of the specifying unit 12 illustrated in FIG. 6.

The specifying unit 12, for example, as illustrated in "COPY DESTINATION LOGICAL VOLUME" represented in FIG. 10, refers to an area (chunk) of the update management table 14c of the TPV 5b that corresponds to the unallocated area of the TPV 5a acquired in the search performed by the release unit 11b. Then, the specifying unit 12 determines whether or not an update area is included in the chunk that has been referred to (whether or not there is a block to which "1" is set). In the examples illustrated in FIG. 10, since there is no block to which "1" is set in the first and fourth chunks from the upper side, the specifying unit 12 determines that there is no update area. On the other hand, since there is a block to which "1" is set in each one of the third and sixth chunks from the upper side, the specifying unit 12 determines that there is an update area.

Then, the specifying unit 12 specifies unallocated areas of the TPV 5a that correspond to the corresponding areas (chunks) of the TPV 5b determined to have update areas included therein. In the example illustrated in FIG. 10, the specifying unit 12 specifies unallocated areas of the TPV 5a that correspond to corresponding areas that are third and sixth areas from the upper side.

As described above, the update management table 14c may be omitted. In such a case, the specifying unit 12 may refer to the copy control table 14a instead of the update management table 14c. For example, the specifying unit 12, as illustrated in "COPY SOURCE LOGICAL VOLUME" represented in FIG. 10, may determine whether or not there is an update area (whether there is a block to which "0" is set) by referring to an area (chunk) of the copy control table 14a relating to the unallocated area of the TPV 5a that is acquired through the search performed by the release unit 11b.

In this way, since the specifying unit 12 appropriately performs the determination described above for unallocated areas detected in the release process by the release unit 11b, each unallocated area for which a corresponding area of the corresponding copy destination TPV 5b includes one or more update areas of the copy destination TPV 5b can be detected at high speed. Accordingly, an increase in the processing time of the copy process and the release process can be suppressed.

In addition, in a case where the specifying unit 12 performs the above-described determination based on the existing copy control table 14a, the holding unit 14 may omit to hold the update management table 14c, and accordingly, the CM 3A can efficiently use the storage area (the memory 32 or the storage unit 36).

The suppression unit 13 causes the release unit 11b to suppress the release of the allocation of the copy destination storage area of the TPP 6b to the corresponding area that corresponds to the unallocated area specified by the specifying unit 12.

For example, the suppression unit 13 notifies the release unit 11b that the unallocated area of the TPV 5a that is specified by the specifying unit 12 is an allocated area to which the storage area of the TPP 6a has been allocated.

In this way, the release unit 11b regards the unallocated area of the TPV 5a that corresponds to the corresponding area of the TPV 5b that includes an update area as a physically-allocated area and does not release the allocation of the storage area for the area (does not instruct the CM 3B to release the allocation).

In this way, according to the suppression unit 13, the release unit 11b is caused to regard the unallocated area specified in accordance with the above-described determination by the specifying unit 12 as not being an originally-unallocated area although the specified unallocated area is detected as the unallocated area by the release unit 11b. Accordingly, the specifying unit 12 can suppress the release process relating to the unallocated area specified in accordance with the above-described determination, whereby the processing time of the entire release process can be reduced.

In addition, when the area (actually, an unallocated area) that is regarded as a physically-allocated area by the release unit 11b is copied, the copy processing unit 11a may transmit dummy data (for example, "0" data) to the corresponding block of the corresponding area (chunk) of the TPV 5b for the block to which "1" is set in the copy control table 14a.

The functions of the access unit 10, the copy unit 11, the specifying unit 12, and the suppression unit 13 described above are realized by the CM 3A (CPU 31) as the storage controller expanding a control program on the memory 32 and executing the control program.

[1-4-2] Configuration of Copy Destination CM

Next, the configuration of the copy destination CM 3B will be described. The CM 3B is equipped with the access unit 20 and the release processing unit 21.

The access unit 20 is connected to the CM 3A and the TPV 5b (DE 4).

The access unit 20, through the DMA port 34, receives an instruction from the CM 3A and transmits a response to the CM 3A. In addition, the access unit 20 performs reading/writing data from/to the TPV 5b (TPP 6b) and the like through the DI 35. Furthermore, in the example illustrated in FIGS. 3 and 6, although the access unit 20 is not connected to the host apparatus 2, the access unit 20 may be connected to the host apparatus 2 through the CA 33 and perform reception of an instruction/transmission of a response from/to the host apparatus 2.

For example, when copy data is received from the access unit 10 together with control information in the copy process, the access unit 20 writes the copy data in an area (in the case of no physical allocation, after a storage area is allocated) of the TPV 5b that is designated in the control information and returns a response.

In addition, when an update instruction of data for the TPV 5b is received (transmitted) from the host apparatus 2 through the access unit 10, the access unit 20 determines whether or not there is an incomplete physical copy relating to the copy instruction in an access area relating to the update instruction.

As described above, the access unit 20 can share information relating to various instructions from the host apparatus 2 with the access unit 10. Accordingly, the access unit 20 can determine whether or not the access area relating to the update instruction is a target area of the incomplete physical copy based on the information relating to the copy instruction received before the update instruction.

As a result of the determination, when it is determined that the access area is not the target area of the incomplete physical copy, the access unit 20 writes the update data relating to the update instruction in the TPV 5b and returns a response of update completion to the host apparatus 2 through the access unit 10.

On the other hand, when it is determined that the access area is the target area of the incomplete physical copy, the access unit 20 notifies the access unit 10 that the physical copy of the access area is incomplete. When the copy data for the access area is received from the access unit 10 (copy processing unit 11a), the access unit 20, after writing the copy data into the access area, writes the update data and returns a response of update completion to the host apparatus 2 through the access unit 10.

When a release command is received from the release unit 11b, the release processing unit 21 releases the allocation of the TPP 6b (copy destination storage area) to the corresponding area of the TPV 5b that is designated in the release command by using the storage virtualization function.

[1-5] Example of Operation of Storage System

Next, an example of the operation of the storage system 1 (CM 3) according to the embodiment configured as described above will be described in accordance with the types of copy instruction.

[1-5-1] Case Where Initiation Instruction (Start Instruction/First Start Instruction) of OPC/QOPC Is Received First, a case will be described with reference to FIGS. 11 to 13 in which the CM 3A receives a start instruction of the OPC or a first start instruction of the QOPC from the host apparatus 2.

Figure 11:
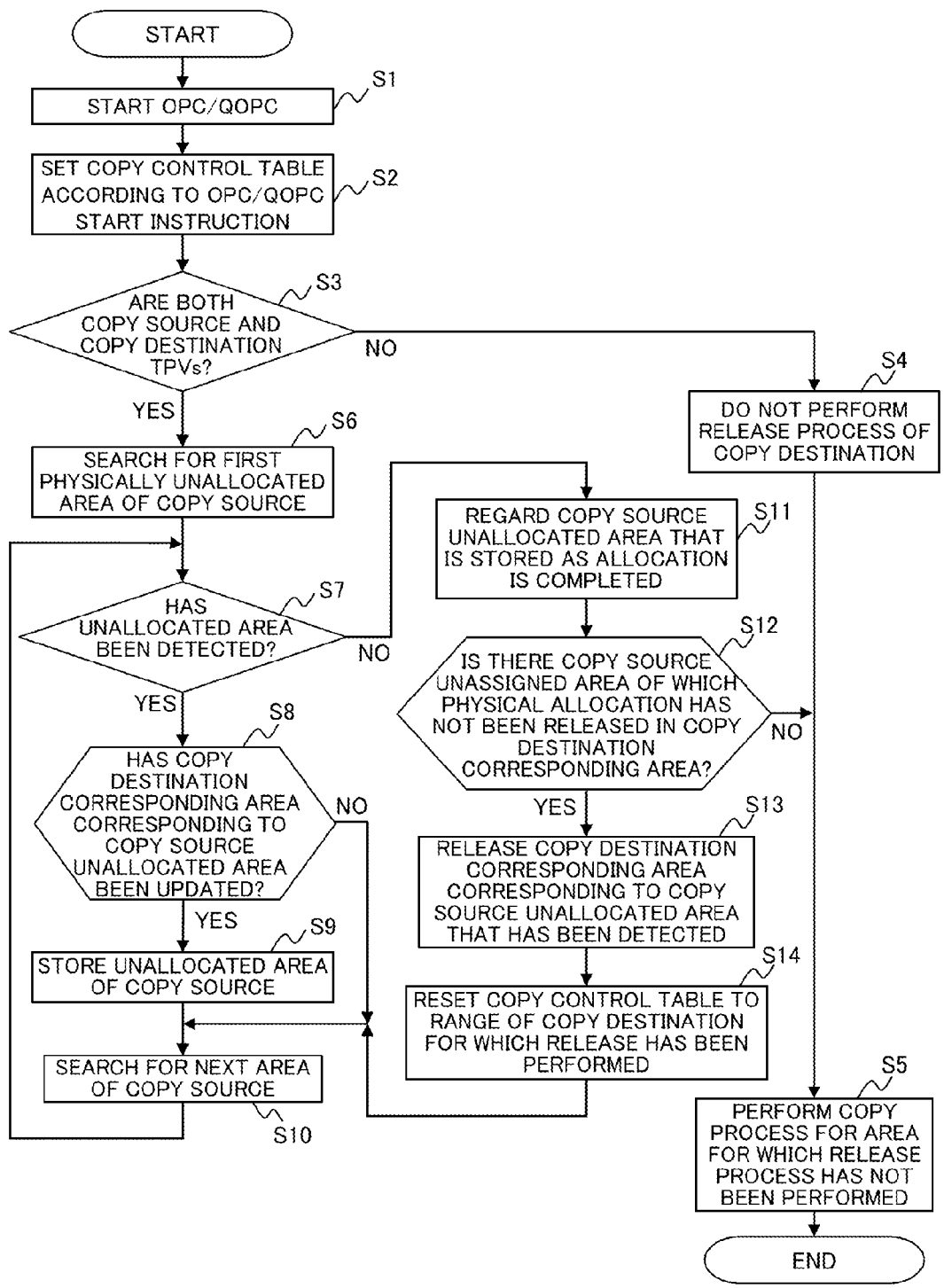
FIG. 11 is a flowchart that illustrates an example of the sequence of a copy process and a release process that are performed by a copy source controller module illustrated in FIG. 6.

FIG. 11 is a flowchart that illustrates an example of the sequence of the copy process and the release process that are performed by the copy source CM 3A illustrated in FIG. 6. FIG. 12 is a diagram that illustrates the release process illustrated in FIG. 11, and FIG. 13 is a diagram that illustrates the appearance after completion of the copy process and the release process illustrated in FIG. 11.

As illustrated in FIG. 11, any one copy instruction of the initiation (start instruction) of the OPC and the initiation (first start instruction) of the QOPC is issued from the host apparatus 2 in Step S1. When the CM 3A receives the copy instruction, a copy session is started by the access unit 10, and logical copy is performed, and a response of the completion of logical copy is transmitted to the host apparatus 2. In addition, "1" is set to the target block of the copy control table 14a for the TPV 5a that is the copy target by the access unit 10 in accordance with the copy instruction in Step S2.

Next, it is determined whether or not both volumes of the copy source and the copy destination designated in the copy instruction are TPVs 5 by the access unit 10 in Step S3.

In a case where at least one of the volumes of the copy source and the copy destination is not the TPV 5 (No route of Step S3), it is determined that the release process of the copy destination is not performed by the CM 3A in Step S4, and the process proceeds to Step S5.

In Step S5, a normal copy operation (physical copy) is performed for an area (blocks of the TPV 5b that correspond to all the blocks for which "1" is set in the copy control table 14a of the target TPV 5a of the copy instruction) for which the release process has not been performed by the copy processing unit 11a, and the process ends.

On the other hand, in a case where both volumes of the copy source and the copy destination are the TPVs 5 (Yes route in Step S3). A first unallocated area of the copy source TPV 5a is searched by the release unit 11b in Step S6 (see (1) in FIG. 12). More specifically, the first unallocated area is searched from the start of the allocation management table 14b for the TPV 5a of the copy target by the release unit 11b.

Next, it is determined whether or not an unallocated area of the copy source TPV 5a has been detected by the release unit 11b in Step S7. In a case where the unallocated area is detected (Yes route of Step S7), the release unit 11b notifies the specifying unit 12 of the detected unallocated area. The specifying unit 12 determines whether or not a corresponding area of the copy destination TPV 5b that corresponds to the notified unallocated area is in an update-completed state in Step S8. More specifically, an area (chunk) of the update management table 14c (or the copy control table 14a) of the TPV 5b that corresponds to the unallocated area is referred to, and it is determined whether or not an update area is included in the referred chunk by the specifying unit 12 (see (2) in FIG. 12 and FIG. 10).

In a case where the corresponding area of the copy destination TPV 5b is in the update-completed state (Yes route of Step S8), information representing the unallocated area of the copy source TPV 5a is stored in the memory 32 or the like by the suppression unit 13 in Step S9. Here, the corresponding area of the copy destination TPV 5b being in the update-completed state represents a case where, after Step S1, the access unit 10 transmits a response of completion of logical copy to the host apparatus 2, and then, an update process for the corresponding area is performed.

Then, the next area of the copy source TPV 5a in the allocation management table 14b is searched by the release unit 11b in Step S10, and the process proceeds to Step S7. In other words, in Step S7, it is determined whether or not the area detected in Step S10 is an unallocated area by the release unit 11b. On the other hand, in Step S8, in a case where the corresponding area of the copy destination TPV 5b is not in the update-completed state (No route of Step S8), the process proceeds to Step S10.

On the other hand, in a case where the unallocated area is not detected in Step S7 (No route of Step S7), in other words, in a case where the unallocated area is not detected in Step S6 or a case where the area acquired through the search in Step S10 is not an unallocated area, the process proceeds to Step S11.

In Step S11, the suppression unit 13 notifies the release unit 11b that the unallocated area stored in the memory 32 or the like in the process of Steps S7 to S10 (Step S9) is an area to which the physical resource is allocated. The release unit 11b receives a notification from the suppression unit 13 and regards the unallocated area of the copy source TPV 5a as an area to which the physical resource is allocated, and the process proceeds to Step S12.

In addition, in a case where the process transits to Step S11 through the No route of Step S7 from Step S6, there is no unallocated area in the copy source TPV 5a. In such a case, in Step S11, since information representing an unallocated area is not stored in the memory 32 or the like, the release unit 11b determines that the release process is not performed.

In Step S12, it is determined whether or not there is an unallocated area of the copy source TPV 5a of which the physical allocation is not released for the corresponding area of the copy destination TPV 5b by the release unit 11b. In a case where there is no unallocated area (No route of Step S12), in other words, in a case where the physical allocation to the corresponding area of the copy destination TPV 5b is released for all the unallocated areas of the copy source TPV 5*a* except for the unallocated area regarded as being physically allocated in Step S11, the process proceeds to Step S5.

In addition, in Step S5, for the corresponding area of the copy destination TPV 5*b* that corresponds to the unallocated area of the copy source TPV 5*a* that is regarded as being allocated in Step S11, the copy processing unit 11*a* writes "0" data to areas except for the update area.

On the other hand, in a case where there is an unallocated area of the copy source TPV 5*a* of which the physical allocation is not released in the corresponding area of the copy destination TPV 5*b* (Yes route of Step S12), the process proceeds to Step S13.

Figure 12:
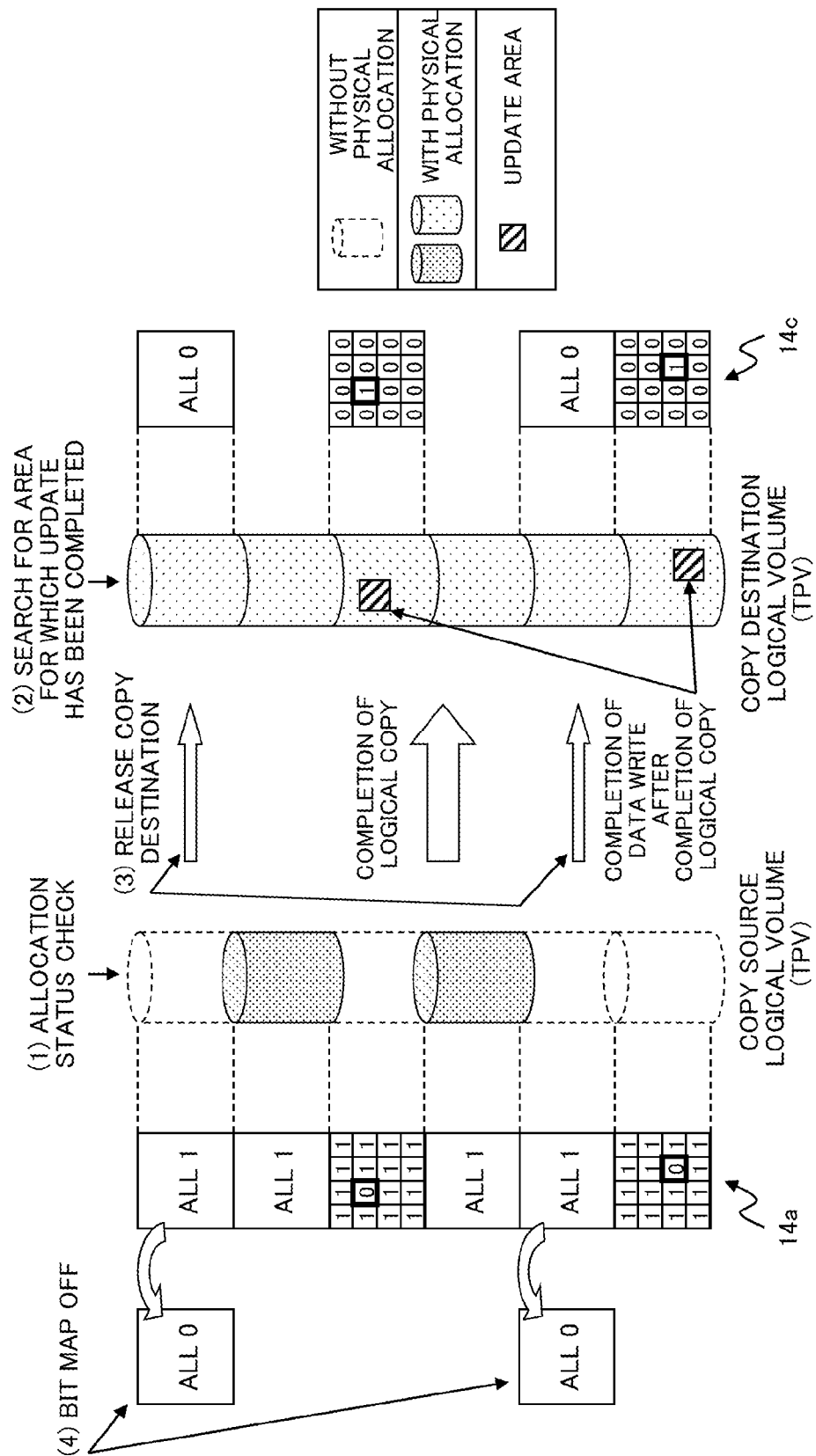
FIG. 12 is a diagram that illustrates the release process illustrated in FIG. 11.

In Step S13, the physical allocation to the corresponding areas of the copy destination TPV 5*b* that correspond to the unallocated areas (except for the unallocated area regarded as being allocated in Step S11) of the copy source TPV 5*a* that have been detected are released by the release unit 11*b* (see (3) in FIG. 12). More specifically, the release unit 11*b* generates a release command relating to the corresponding area to be released and transmits the release command to the release processing unit 21 of the CM 3B. The release processing unit 21 releases the physical allocation to the corresponding areas in accordance with the received release command.

Next, the access unit 10 resets the bitmap of the copy control table 14*a* to "0" in the range corresponding to the corresponding areas, for which the copy destination TPV 5*b* is released in Step S14, in Step S14, and the process proceeds to Step S10. In other words, the access unit 10 sets all the bits inside the chunk of the unallocated area of the copy source TPV 5*a* that corresponds to the corresponding area for which the copy destination TPV 5*b* is released to "0" in the copy control table 14*a* (see (4) in FIG. 12).

Figure 13:
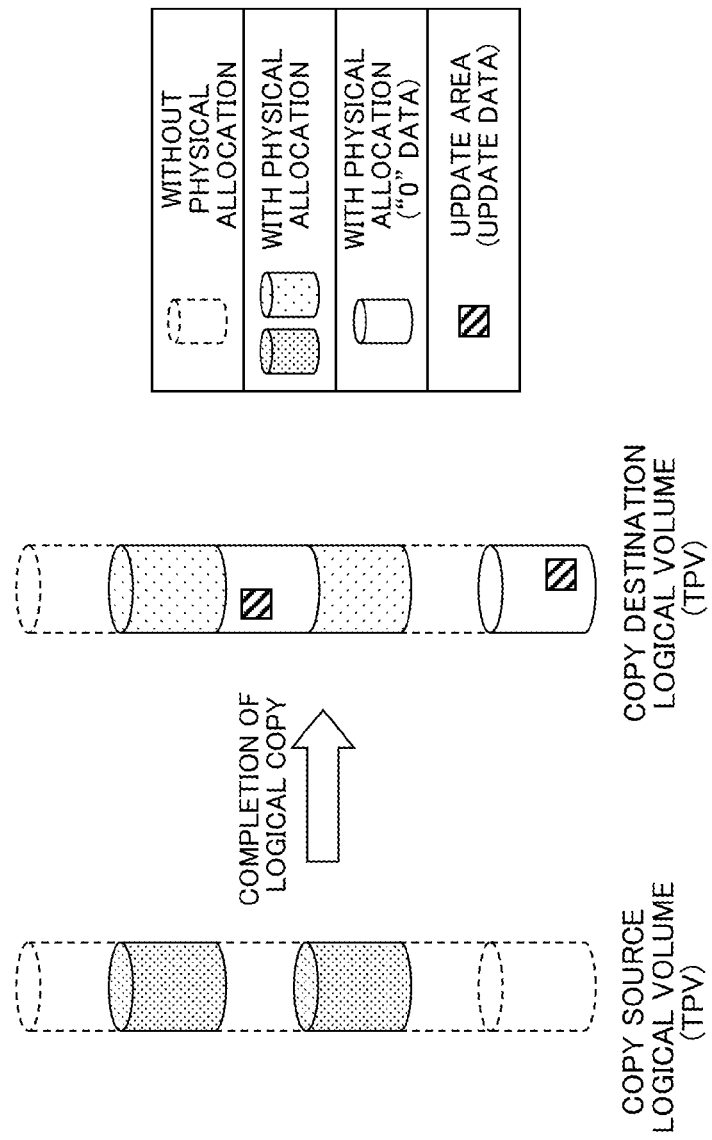
FIG. 13 is a diagram that illustrates the appearance after completion of the copy process and the release process illustrated in FIG. 11.

According to the above-described process, in the storage system 1, as illustrated in FIG. 13, the physical allocation to the corresponding area including update areas (update data) among corresponding areas of the copy destination TPV 5*b* that correspond to the unallocated areas of the copy source TPV 5*a* is not released, and "0" data is written into areas other than the update areas.

Therefore, according to the storage system 1 (CM 3) of the embodiment, the consistency (consistence of data) of the execution sequence of the copy process of the TPV 5*a* according to the start instruction of the OPC/QOPC and the update process for the copy destination TPV 5*b* after the instruction of the copy process can be maintained.

In the process illustrated in FIG. 11, the process of Step S9 may be omitted, and the process of Step S11 may be performed instead thereof. In such a case, the process of Step S11 that is performed before the process of Step S12 may be omitted.

[1-5-2] Case where Restart Instruction of QOPC is Received

Next, a case where a restart instruction of the QOPC is received by the CM 3A from the host apparatus 2 will be described with reference to FIGS. 14 to 17.

Figure 14:
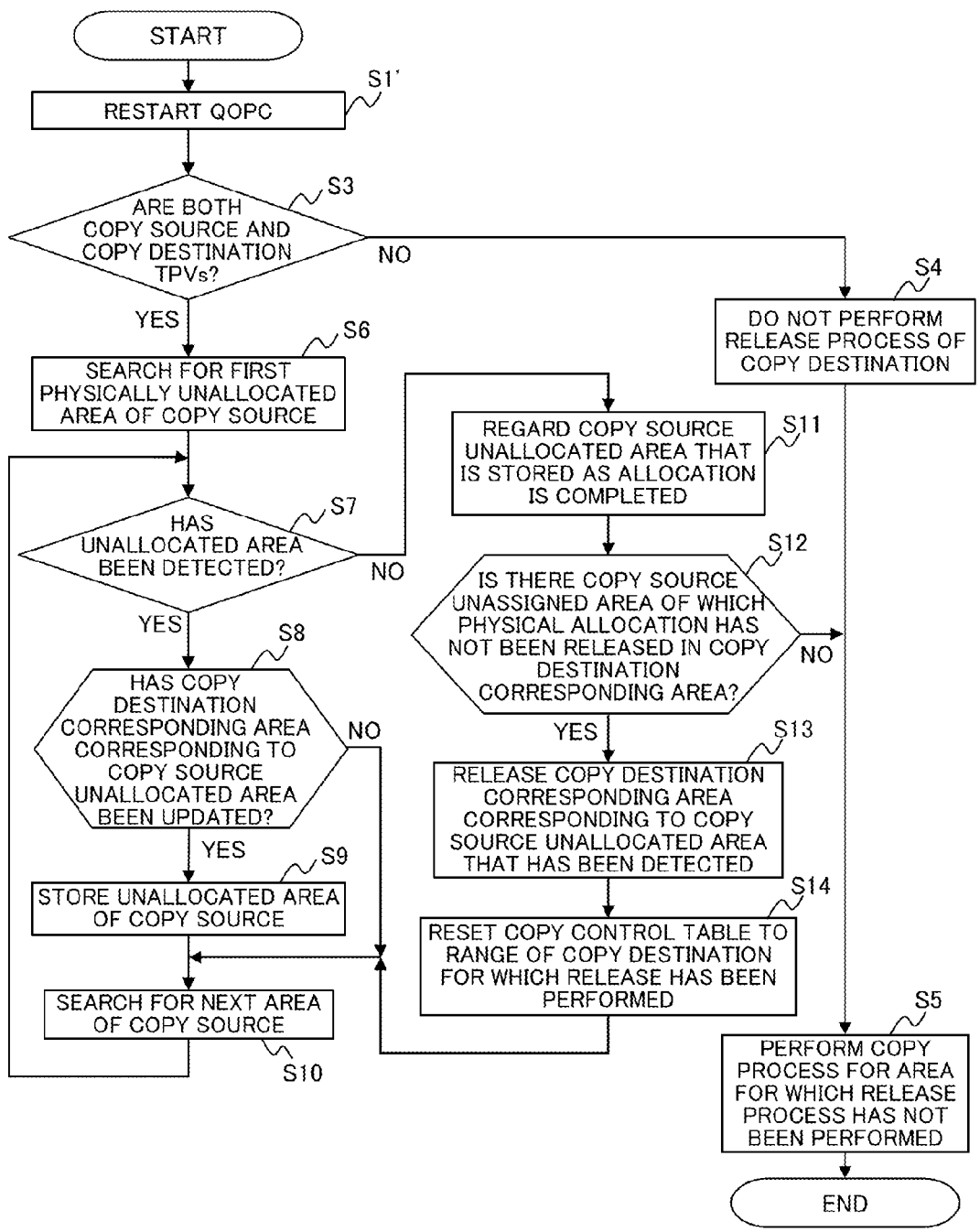
FIG. 14 is a flowchart that illustrates an example of the sequence of the copy process and the release process performed by the copy source controller module illustrated in FIG. 6.
Figure 15:
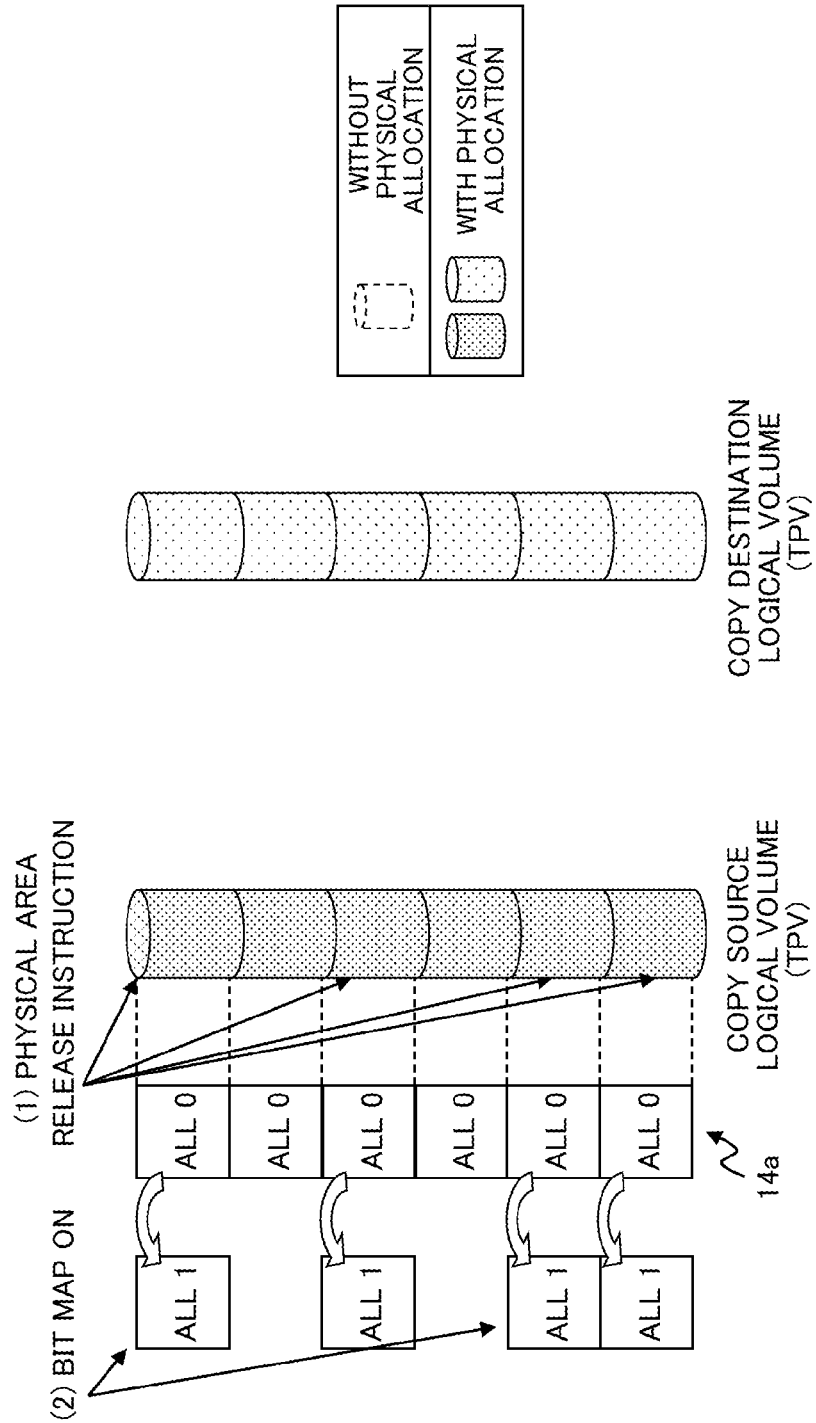
FIG. 15 is a diagram that illustrates the appearance in which a copy source logical volume is released after the completion of the copy process illustrated in FIG. 11.
Figure 16:
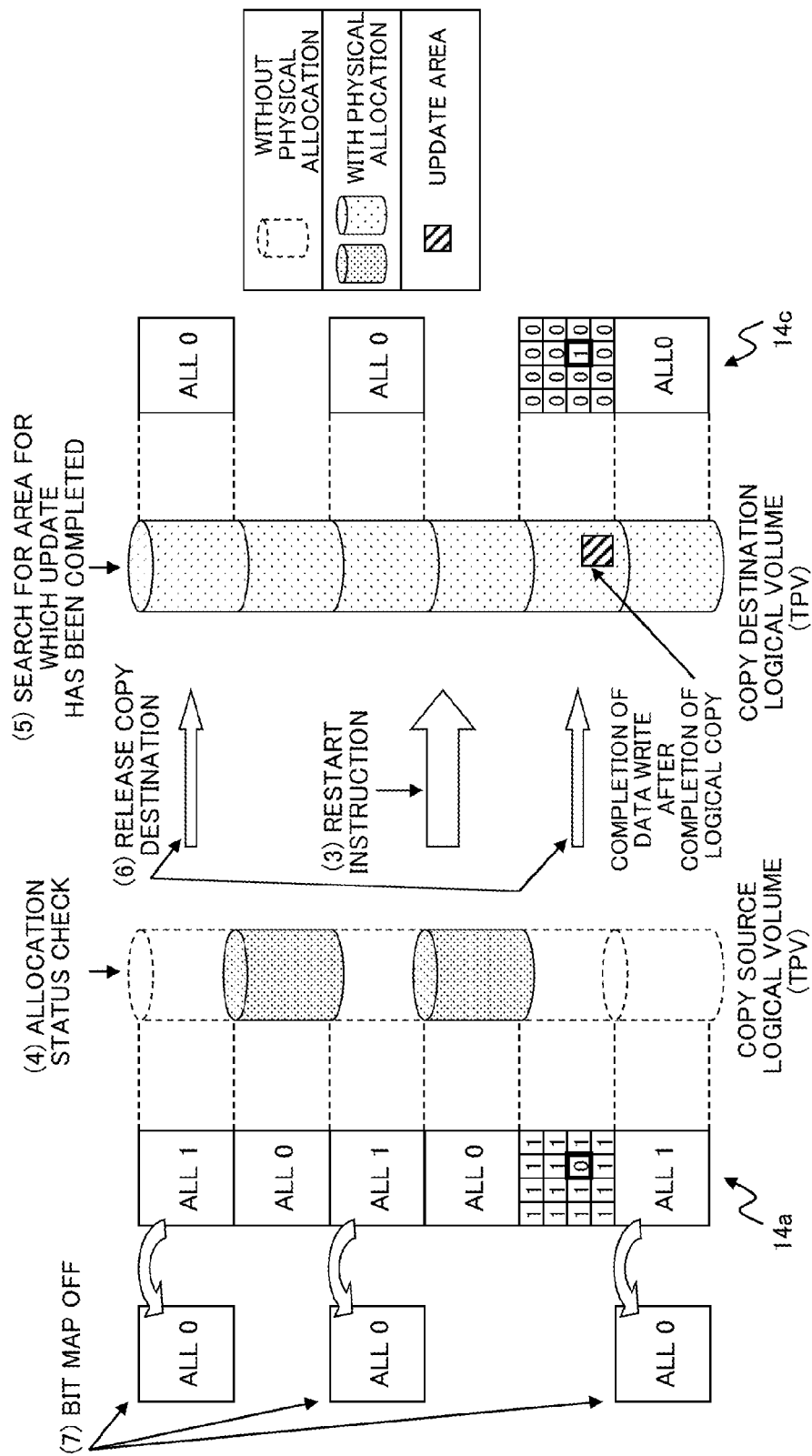
FIG. 16 is a diagram that illustrates the release process illustrated in FIG. 14.
Figure 17:
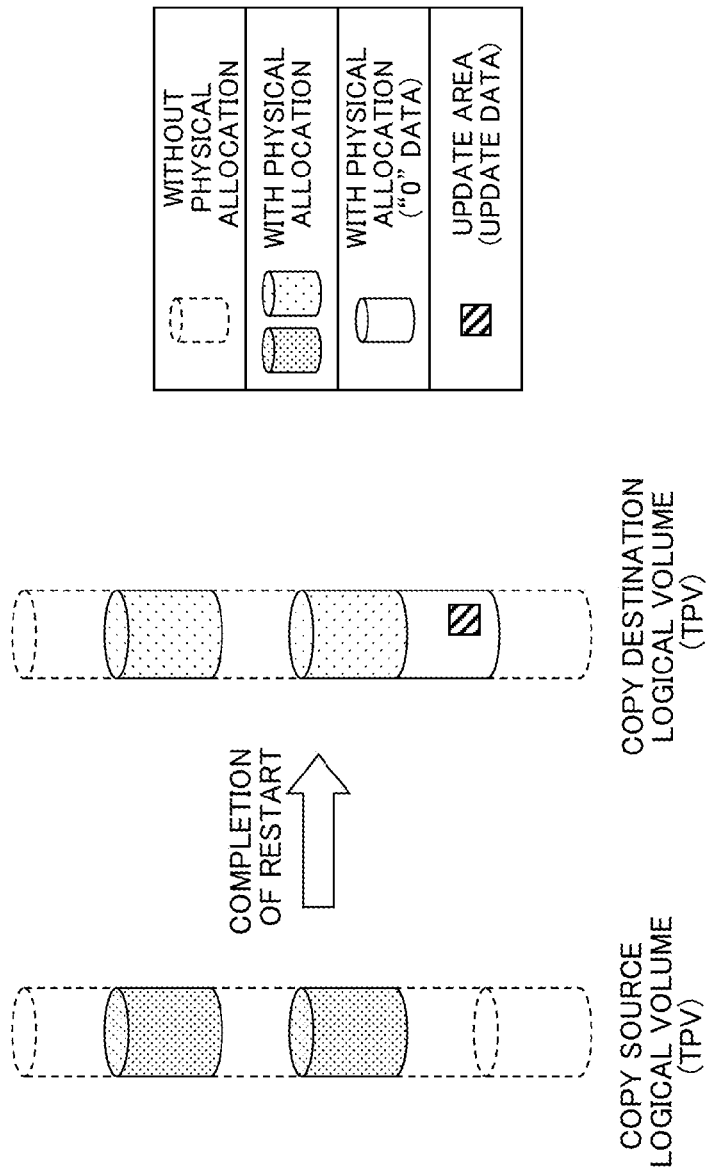
FIG. 17 is a diagram that illustrates the appearance after completion of the copy process and the release process illustrated in FIG. 14.
Figure 18:
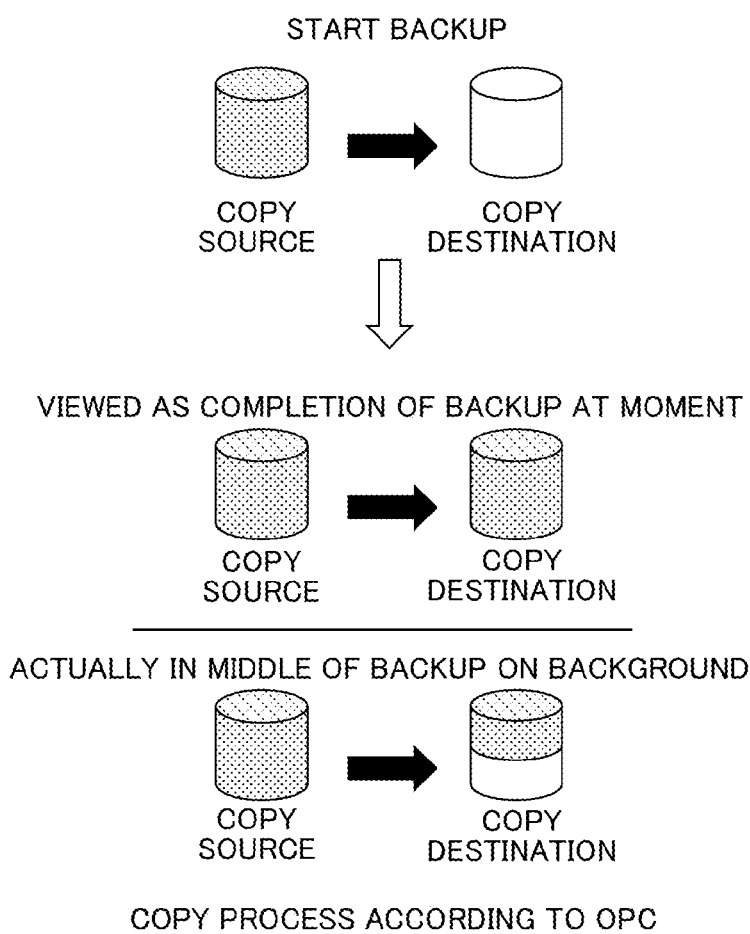
FIG. 18 is a diagram that illustrates the appearance of a copy process according to an OPC.
Figure 19:
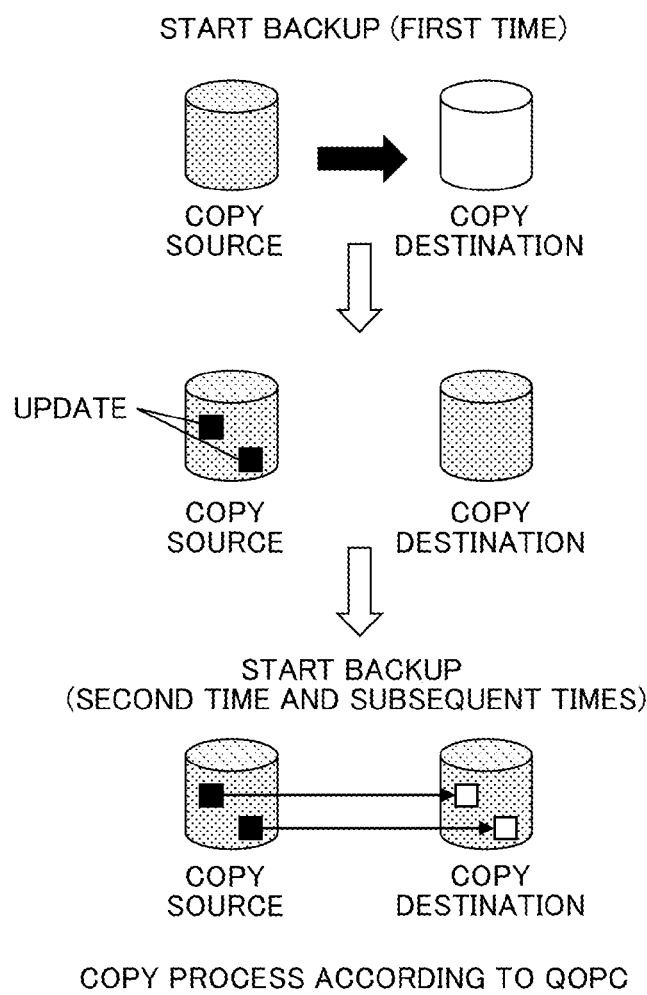
FIG. 19 is a diagram that illustrates the appearance of a copy process according to a QOPC.
Figure 20A:
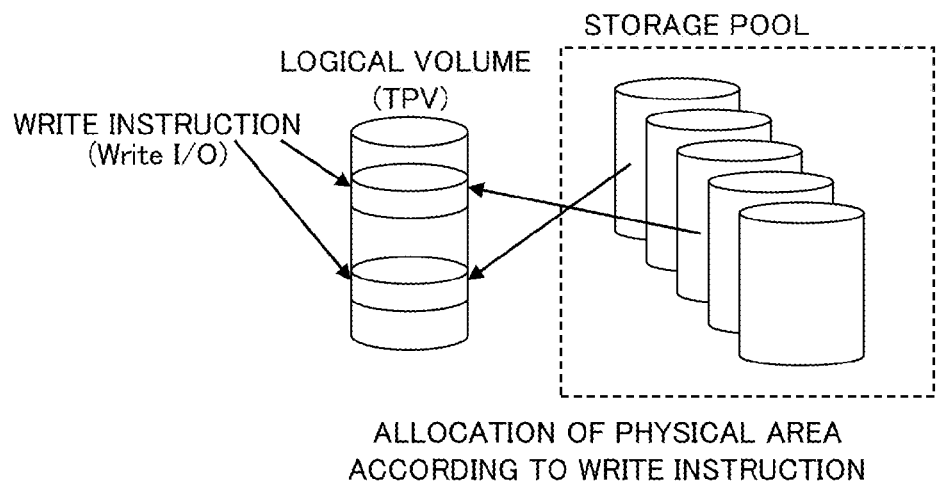
FIGS. 20A and 20B are diagrams that illustrate examples of a storage virtualization function.
Figure 20B:
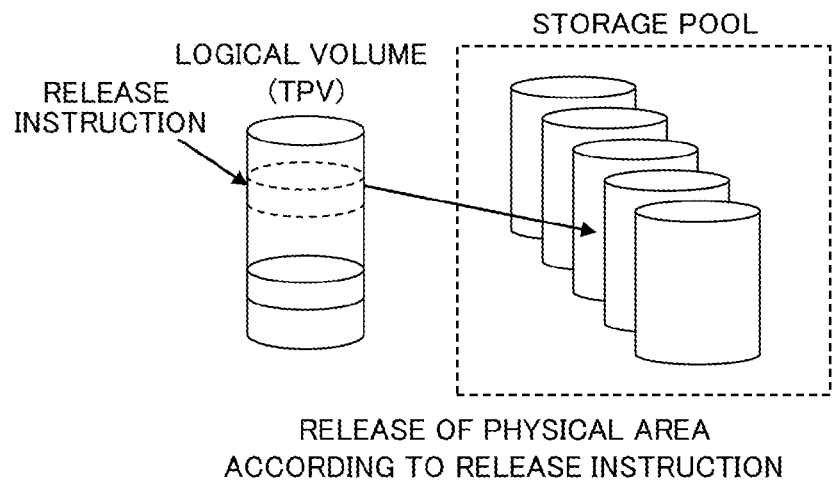

FIG. 14 is a flowchart that illustrates an example of the sequence of the copy process and the release process performed by the copy source CM 3A illustrated in FIG. 6. FIG. 15 is a diagram that illustrates the appearance in which the copy source TPV 5*a* is released after the completion of the copy process illustrated in FIG. 11. FIG. 16 is a diagram that illustrates the release process illustrated in FIG. 14. FIG. 17 is a diagram that illustrates the appearance after completion of the copy process and the release process illustrated in FIG. 14.

While the process illustrated in FIG. 14 is different from the process illustrated in FIG. 11 that Step S1' is executed instead of Step S1, and Step S2 is not executed, the other processes are basically the same as those illustrated in FIG. 11. In FIG. 14, each process to which the same reference sign as that illustrated in FIG. 11 is attached represents the same process or approximately the same process, and thus, duplicate description will not be presented.

Hereinafter, a copy process and a release process accompanied with a restart instruction of the QOPC will be described along the flow of the release process illustrated in FIG. 16.

As the premise of the description, it is assumed that the storage system 1 can perform the QOPC, and a copy process accompanied with a first start instruction of the QOPC has been completed. In addition, it is assumed that there is no unallocated area in the copy source TPV 5*a* at a time point when the copy process accompanied with the first start instruction is completed.

Here, the copy session of the QOPC remains even after completion of the copy process, and, in a case where there is an update for the copy source TPV 5*a*, as described above, the content of the update is stored in the copy control table 14*a*. For example, as illustrated in FIG. 15, after the completion of the copy process accompanied with the first start instruction, a physical area release instruction is assumed to be issued from the host apparatus 2 to the copy source TPV 5*a* (see (1) in FIG. 15). At this time, the access unit 10 releases the allocation of the storage area of the copy source TPP 6*a* to the areas (chunks) designated in the instruction and sets "1" to all the bitmaps of the corresponding areas (chunks) of the copy control table 14*a* (see (2) in FIG. 15).

Thereafter, when a restart instruction of the QOPC is issued from the host apparatus 2 in the state in which there is an unallocated area in the copy destination TPV 5*a* (see Step S1' represented in FIG. 14 and (3) represented in FIG. 16), logical copy is performed in accordance with a copy session by the access unit 10. Then, the access unit 10 transmits a response of completion of the logical copy to the host apparatus 2. When the restart instruction of the QOPC is received, "1" is set to the block for which there is update in the copy source TPV 5*a* in the copy control table 14*a* after the completion of the previous copy process, and accordingly, the process of Step S2 illustrated in FIG. 11 is not performed.

Next, the release unit 11*b*, as illustrated in (4) represented in FIG. 16, searches a first unallocated area of the copy source TPV 5*a* (see Step S6 represented in FIG. 14).

In addition, the specifying unit 12, as illustrated in (5) represented in FIG. 16 and FIG. 10, determines whether or not the corresponding area of the copy destination TPV 5*b* that corresponds to the unallocated area detected by the release unit 11*b* is in the update-completed state by referring to the update management table 14*c* (or the copy control table 14*a*) (see Step S8 represented in FIG. 14).

The suppression unit 13 notifies the release unit 11*b* that the unallocated area corresponding to the corresponding area of the copy destination TPV 5*b* that has been determined to be in the update-completed state by the specifying unit 12 is allocated, and the release unit 11*b* receives the notification and regards the unallocated area stored in the memory 32 or the like as being allocated (see Step S11 represented in FIG. 14). Then, the release unit 11*b*, as illustrated in (6) represented in FIG. 16, releases the physical allocation of the copy destination TPV 5*b* to the corresponding areas that correspond to the unallocated areas (except for the unallocated area regarded as being allocated in Step S11 represented in FIG. 14) of the copy source TPV 5*a* that have been detected.

Thereafter, the access unit 10, as illustrated in (7) represented in FIG. 16, resets the bitmap of the copy control table 14a to "0" in a range corresponding to the corresponding areas for which the release of the copy destination TPV 5b has been performed (see Step S14 represented in FIG. 14).

According to the above-described process, in the storage system 1, as illustrated in FIG. 17, among the corresponding areas of the copy destination TPV 5b that correspond to the unallocated areas of the copy source TPV 5a, the physical allocation to the corresponding area including an update area (update data) is not released, but "0" state is written into areas other than the update area.

Therefore, according to the storage system 1 (CM 3) of the embodiment, the consistency (the consistency of data) of the execution sequence of the copy process of the TPV 5a according to the restart instruction of the QOPC and the update process for the copy destination TPV 5b after the instruction of the copy process can be maintained.

[2] Others

As above, while the preferred embodiment of the present invention has been described in detail, the present invention is not limited to such a specific embodiment but may be variously modified or changed within a range not departing from the concept of the present invention.

For example, the functions of the copy unit 11 (the copy processing unit 11a and the release unit 11b), the specifying unit 12, and the suppression unit 13 of the copy source CM 3A described above may be integrated or distributed in accordance with an arbitrary combination. Similarly, the functions of the access unit 20 and the release processing unit 21 of the copy destination CM 3B may be integrated or distributed in accordance with an arbitrary combination In addition, regarding the above-described CMs 3, while the copy source has been described to include the function of the CM 3A, and the copy source has been described to include the function of the CM 3B, the CM 3 may include the functions of both the CMs 3A and 3B such that CM 3 can respond to any one of the copy source and the copy destination.

Furthermore, while the above-described storage system 1 has been described to perform the OPC or the QOPC as the advanced copy function, the advanced function is not limited thereto, and equivalent copy (EC) for performing equivalent copy inside the casing may be performed. In addition, the storage system 1 may perform remote OPC, remote QOPC, remote EC (REC), and the like with another storage system 1 as inter-casing copy. Also in a case where the storage system 1 performs various advanced copy operations inside the casing between the casings, the CMs 3A and 3B described above may be applied. Furthermore, in the case of inter-casing copy, the CM 3 may include a remote adaptor (RA) and perform communication, for example, using a small computer system interface (SCSI) command or the like through the RA.

All or some of the various functions of the CM 3 (storage controller) according to the embodiment and a modified example thereof may be realized by executing a predetermined program (control program) using a computer (including a CPU, an information processing apparatus, and various terminals).

The program is provided in a form being recorded in a computer-readable recording medium (for example, the recording medium 39b illustrated in FIG. 5) such as a flexible disk, a CD, a DVD, or a Blue-ray disc. Examples of the CD include a CD-ROM, a CD-R, and a CD-RW. In addition, examples of the DVD include a DVD-ROM, a DVD-RAM, a DVD-R, a DVD-RW, a DVD+R, and a DVD+RW. In addition, the program may be configured to be recoded in a storage device (recording medium) such as a magnetic disk, an optical disc, a magneto-optical disk and be provided for a computer through a communication line from the storage device.

According to the embodiments, an inconvenience occurring when a virtual volume to which a storage area of a storage device is variably allocated in accordance with the volume use status is copied can be solved.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. A storage controller comprising:
a processor,
wherein the processor:
performs a copy process in which a copy destination virtual volume is created by copying a virtual volume to which a storage area of a storage device is variably allocated in accordance with a volume use status in accordance with a copy instruction;
performs a release process in which allocation of a copy destination storage area to a corresponding area of the copy destination virtual volume that corresponds to an unallocated area to which a copy source storage area is not allocated, among areas of a copy source virtual volume at a time point when the copy instruction is received is released, in the copy process;
manages information that represents one or more update areas of the copy destination virtual volume updated before the copy process and the release process are performed and after the copy instruction;
specifies an unallocated area for which a corresponding area includes the one or more update areas among one or more unallocated areas of the copy source virtual volume; and
suppresses the release of the allocation of the copy destination storage area to the corresponding area corresponding to the specified unallocated area in the release process.

2. The storage controller according to claim 1,
wherein the processor regards the specified unallocated area as an allocated area to which the copy source storage area is allocated in the release process and does not release the allocation of the copy destination storage area to the corresponding area corresponding to the unallocated area regarded as the allocated area.

3. The storage controller according to claim 1,
wherein the processor:
manages allocation management information that represents whether or not the copy source storage area is allocated to the copy source virtual volume;
searches for an unallocated area from the copy source virtual volume based on the allocation management information in the release process; and
specifies an unallocated area for which a corresponding area includes the one or more update areas by determining whether or not the corresponding area corresponding to the unallocated area detected by the search includes the one or more update areas.

4. The storage controller according to claim 1,
wherein the processor:
manages copy control information that represents target areas of the copy process in the copy source virtual volume and excludes an area corresponding to the update area among the target areas of the copy control information from the target areas of the copy process; and
specifies an unallocated area for which a corresponding area includes the one or more update areas based on the copy control information.

5. The storage controller according to claim 4,
wherein the processor writes dummy data in an area other than the update areas among corresponding areas corresponding to the specified unallocated area based on the copy control information in the copy process.

6. The storage controller according to claim 1,
wherein the release process performed by the processor is performed before the copy process.

7. A storage system comprising:
first and second storage controllers that manage a virtual volume to which storage areas of a storage device is variably allocated in accordance with a volume use status,
wherein the first storage controller includes a first processor,
wherein the first processor:
performs a copy process in which a copy destination virtual volume is created in the second storage controller by copying a copy source virtual volume managed by the first storage controller in accordance with a copy instruction;
performs a release process in which allocation of a copy destination storage area to a corresponding area of the copy destination virtual volume that corresponds to an unallocated area to which a copy source storage area is not allocated, among areas of a copy source virtual volume at a time point when the copy instruction is received is released, in the copy process;
manages information that represents one or more update areas of the copy destination virtual volume updated before the copy process and the release process are performed and after the copy instruction;
specifies an unallocated area for which a corresponding area includes the one or more update areas among one or more unallocated areas of the copy source virtual volume; and
suppresses the release of the allocation of the copy destination storage area to the corresponding area corresponding to the specified unallocated area in the release process.

8. The storage system according to claim 7,
wherein the first processor regards the specified unallocated area as an allocated area to which the copy source storage area is allocated in the release process and does not release the allocation of the copy destination storage area to the corresponding area corresponding to the unallocated area regarded as the allocated area.

9. The storage system according to claim 7,
wherein the first processor:
manages allocation management information that represents whether or not the copy source storage area is allocated to the copy source virtual volume;
searches for an unallocated area from the copy source virtual volume based on the allocation management information in the release process; and
specifies an unallocated area for which a corresponding area includes the one or more update areas by determining whether or not the corresponding area corresponding to the unallocated area detected by the search includes the one or more update areas.

10. The storage system according to claim 7,
wherein the first processor:
manages copy control information that represents target areas of the copy process in the copy source virtual volume and excludes an area corresponding to the update area among the target areas of the copy control information from the target areas of the copy process; and
specifies an unallocated area for which a corresponding area includes the one or more update areas based on the copy control information.

11. The storage system according to claim 10,
wherein the first processor writes dummy data in an area other than the update areas among corresponding areas corresponding to the specified unallocated area based on the copy control information in the copy process.

12. The storage system according to claim 7,
wherein the first processor issues a release instruction for releasing the allocation of the copy destination storage area to a corresponding area corresponding to the unallocated area, to the second storage controller,
wherein the second storage controller includes a second processor, and
wherein the second processor releases the allocation of the copy destination storage area to the corresponding area designated by the release instruction given from the first storage controller.

13. The storage system according to claim 7,
wherein the release process performed by the first processor is performed before the copy process.

14. A computer-readable recording medium having stored therein a control program for causing a computer to execute a process for managing a virtual volume to which storage areas of a storage device is variably allocated in accordance with a volume use status, the process comprising:
performing a copy process in which a copy destination virtual volume is created by copying a copy source virtual volume in accordance with a copy instruction;
performing a release process in which allocation of a copy destination storage area to a corresponding area of the copy destination virtual volume that corresponds to an unallocated area to which a copy source storage area is not allocated, among areas of a copy source virtual volume at a time point when the copy instruction is received is released, in the copy process;
managing information that represents one or more update areas of the copy destination virtual volume updated before the copy process and the release process are performed and after the copy instruction;
specifying an unallocated area for which a corresponding area includes the one or more update areas among one or more unallocated areas of the copy source virtual volume; and
suppressing the release of the allocation of the copy destination storage area to the corresponding area corresponding to the specified unallocated area in the release process.

15. The computer-readable recording medium according to claim 14, wherein, in the release process, the unallocated area specified in the specifying of an unallocated area is regarded as an allocated area to which the copy source storage area is allocated, and the allocation of the copy destination storage area to the corresponding area corresponding to the unallocated area regarded as the allocated area is not released.

16. The computer-readable recording medium according to claim 14,
    wherein the process further comprising managing allocation management information that represents whether or not the copy source storage area is allocated to the copy source virtual volume,
    wherein an unallocated area is searched from the copy source virtual volume based on the allocation management information in the release process; and
    wherein, in the specifying of an unallocated area, an unallocated area for which a corresponding area includes the one or more update areas is specified by determining whether or not the corresponding area corresponding to the unallocated area detected by the search includes the one or more update areas.

17. The computer-readable recording medium according to claim 14,
    wherein the process further comprising:
        managing copy control information that represents target areas of the copy process in the copy source virtual volume, and
        excluding an area corresponding to the update area among the target areas of the copy control information from the target areas of the copy process, and
    wherein, in the specifying of an unallocated area, an unallocated area for which a corresponding area includes the one or more update areas is specified based on the copy control information.

18. The computer-readable recording medium according to claim 17,
    wherein, in the copy process, dummy data is written in an area other than the update areas among corresponding areas corresponding to the specified unallocated area based on the copy control information in the specifying process.

19. The computer-readable recording medium according to claim 14,
    wherein the release process is performed before the copy process.

* * * * *